United States Patent
Hoffman et al.

(10) Patent No.: US 12,026,200 B2
(45) Date of Patent: Jul. 2, 2024

(54) DETECTING PROMINENCE OF OBJECTS IN VIDEO INFORMATION

(71) Applicant: Microsoft Technology Licensing, LLC, Redmond, WA (US)

(72) Inventors: Yonit Hoffman, Herzeliya (IL); Tom Hirshberg, Haifa (IL); Maayan Yedidia, Ramat Gan (IL); Zvi Figov, Modiin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/865,117

(22) Filed: Jul. 14, 2022

(65) Prior Publication Data
US 2024/0020338 A1    Jan. 18, 2024

(51) Int. Cl.
*G06F 16/78* (2019.01)
*G06F 3/04847* (2022.01)
*G06F 16/738* (2019.01)
*G06F 16/783* (2019.01)
*G06V 20/40* (2022.01)

(52) U.S. Cl.
CPC ........ *G06F 16/739* (2019.01); *G06F 3/04847* (2013.01); *G06F 16/784* (2019.01); *G06V 20/46* (2022.01)

(58) Field of Classification Search
USPC ........................................... 386/241
See application file for complete search history.

(56) References Cited

U.S. PATENT DOCUMENTS

| 9,177,225 | B1* | 11/2015 | Cordova-Diba | .......... G06T 7/12 |
| 10,083,162 | B2 | 9/2018 | Kasina | |
| 10,109,051 | B1* | 10/2018 | Natesh | .................. G06V 20/10 |
| 10,861,037 | B1* | 12/2020 | Roberts | ............. G06Q 30/0212 |

(Continued)

FOREIGN PATENT DOCUMENTS

WO    2019183061 A1    9/2019

OTHER PUBLICATIONS

Hirshberg, Tom, "When AI meets fashion: Azure Video Indexer's new model for detecting Featured Clothing in videos," available at https://techcommunity.microsoft.com/t5/ai-applied-ai-blog/when-ai-meets-fashion-azure-video-indexer-s-new-model-for/ba-p/3588029, Microsoft AI—Applied AI Blog, Aug. 1, 2022, 8 pages.

(Continued)

*Primary Examiner* — Nigar Chowdhury

(57) ABSTRACT

A video-processing technique uses machine-trained logic to detect and track people that appear in video information. The technique then ranks the prominence of these people in the video information, to produce ranking information. The prominence of a person reflects a level of importance of the person in the video information, corresponding to the capacity of the person to draw the attention of a viewer. For instance, the prominence of the person reflects, at least in part, an extent to which the person appears in the video information. The technique performs its ranking based on person-specific feature information. The technique produces each instance of person-specific feature information by accumulating features pertaining to a particular person. One or more application systems make use of the ranking information to control the presentation of the video information.

20 Claims, 11 Drawing Sheets

(56) References Cited

U.S. PATENT DOCUMENTS

| | | | |
|---|---|---|---|
| 10,963,939 B1* | 3/2021 | Zehr | G06Q 30/0603 |
| 11,501,358 B2* | 11/2022 | Maldonado | G06Q 30/0631 |
| 11,790,048 B2* | 10/2023 | Daniali | G06F 18/251 |
| | | | 455/456.3 |
| 2009/0116698 A1* | 5/2009 | Zhang | G06Q 30/0601 |
| | | | 345/581 |
| 2013/0343615 A1* | 12/2013 | Zhang | G06V 20/10 |
| | | | 382/111 |
| 2018/0018144 A1* | 1/2018 | Morris | G10L 13/00 |
| 2018/0150444 A1* | 5/2018 | Kasina | G06F 40/186 |
| 2021/0027089 A1* | 1/2021 | Phillips | G06K 7/1443 |
| 2021/0105122 A1* | 4/2021 | Xiong | H04J 3/16 |
| 2021/0105338 A1* | 4/2021 | Oyman | H04L 12/2876 |
| 2021/0105451 A1* | 4/2021 | Oyman | H04N 19/597 |

OTHER PUBLICATIONS

PCT Search Report and Written Opinion for PCT/US2023/025011, mailing date listed on Report: Aug. 28, 2023, received by undersigned: Aug. 24, 2023, 13 pages.

"Customize a Person model in Azure Video Indexer," available at https://docs.microsoft.com/en-us/azure/azure-video-indexer/customize-person-model-overview, Microsoft Docs, Microsoft Corporation, Redmond, WA, May 24, 2022, 3 pages.

"What is the Azure Face service?," available at https://docs.microsoft.com/en-us/azure/cognitive-services/computer-vision/overview-identity, Microsoft Docs, Microsoft Corporation, Redmond, WA, Jun. 22, 2022, 3 pages.

"Trace observed people in a video (preview)," available at https://docs.microsoft.com/en-us/azure/azure-video-indexer/observed-people-tracing, Microsoft Docs, Microsoft Corporation, Redmond, WA, May 24, 2022, 5 pages.

Ciaparrone, e al., "Deep Learning in Video Multi-Object Tracking: A Survey," arXiv, Cornell University, arXiv:1907.12740v4 [cs.CV], Nov. 19, 2019, 42 pages.

"What is Optical character recognition?," available at https://docs.microsoft.com/en-us/azure/cognitive-services/computer-vision/overview-ocr, Microsoft Docs, Microsoft Corporation, Redmond, WA, Jun. 22, 2022, 6 pages.

"Customize a Brands model in Azure Video Indexer," available at https://docs.microsoft.com/en-us/azure/azure-video-indexer/customize-brands-model-overview, Microsoft Docs, Microsoft Corporation, Redmond, WA, May 24, 2022, 4 pages.

What is Image Analysis?, available at https://docs.microsoft.com/en-us/azure/cognitive-services/computer-vision/overview-image-analysis, Microsoft Docs, Microsoft Corporation, Redmond, WA, Jun. 22, 2022, 7 pages.

"Audio effects detection (preview)," available at https://docs.microsoft.com/en-us/azure/azure-video-indexer/audio-effects-detection, Microsoft Docs, Microsoft Corporation, Redmond, WA, May 31, 2022, 7 pages.

Fang, et al., "From Captions to Visual Concepts and Back," arXiv, Cornell University, arXiv:1411.4952v3 [cs.CV], Apr. 14, 2015, 10 pages.

Zhong, et al., "Face Transformer for Recognition," arXiv, Cornell University, arXiv:2103.14803v2 [cs.CV], Apr. 13, 2021, 5 pages.

Liu, et al., "SSD: Single Shot MultiBox Detector," arXiv, Cornell University, arXiv:1512.02325v5 [cs.CV], Dec. 29, 2016, 17 pages.

Redmon, "You Only Look Once: Unified, Real-Time Object Detection," arXiv, Cornell University, arXiv:1506.02640v5 [cs.CV], May 9, 2016, 10 pages.

"Detect common objects in images," available at https://docs.microsoft.com/en-us/azure/cognitive-services/computer-vision/concept-object-detection, Microsoft Docs, Microsoft Corporation, Redmond, WA, Jun. 21, 2022, 5 pages.

Luo, et a l., "Multiple Object Tracking: A Literature Review," arXiv, Cornell University, arXiv:1409.7618v5 [cs.CV], Feb. 11, 2022, 49 pages.

Wojke, et al., "Simple Online and Realtime Tracking With a Deep Association Metric," arXiv, Cornell University, arXiv:1703.07402v1 [cs.CV], Mar. 21, 2017, 5 pages.

Pal, et al., "Deep learning in multi-object detection and tracking: state of the art," in Applied Intelligence, 51, Apr. 2021, pp. 6400-6429.

Apostolidis, "Video Summarization Using Deep Neural Networks: A Survey," arXiv, Cornell University, arXiv:2101.06072v2 [cs.CV], Sep. 27, 2021, 26 pages.

Khaireddin, et al., "Facial Emotion Recognition: State of the Art Performance on FER2013," arXiv, Cornell University, arXiv:2105.03588v1 [cs.CV], May 8, 2021, 9 pages.

Wang, et al., "Deep Face Recognition: A Survey," arXiv, Cornell University, arXiv:1804.06655v9 [cs.CV], Aug. 1, 2020, 31 pages.

Minaee, et al., "Going Deeper Into Face Detection: A Survey," arXiv, Cornell University, arXiv:2103.14983v2 [cs.CV], Apr. 13, 2021, 17 pages.

Kortli, et al., "Face Recognition Systems: A Survey," in Sensors 20, 342, 2020, 36 pages.

Aafaq, et al., "Video Description: A Survey of Methods, Datasets and Evaluation Metrics," arXiv, Cornell University, arXiv:1806.00186v4 [cs.CV], Mar. 3, 2020, 28 pages.

Stefanini, et al., "From Show to Tell: A Survey on Deep Learning-based Image Captioning," arXiv, Cornell University, arXiv:2107.06912v3 [cs.CV], Nov. 30, 2021, 27 pages.

Hossain et al., "A Comprehensive Survey of Deep Learning for Image Captioning," in ACM Computing Surveys, vol. 51, No. 6, Article 118, Feb. 2019, 36 pages.

"Describe images with human-readable language," available at https://docs.microsoft.com/en-us/azure/cognitive-services/computer-vision/concept-describing-images, Microsoft Docs, Microsoft Corporation, Redmond, WA, Jun. 21, 2022, 4 pages.

"Detect popular brands in images," available at https://docs.microsoft.com/en-us/azure/cognitive-services/computer-vision/concept-brand-detection, Microsoft Docs, Microsoft Corporation, Redmond, WA, Mar. 2, 2022, 4 pages.

Priyanga, et al., "A survey on efficient logo recognition and detection techniques," in JASC: Journal of Applied Science and Computations, vol. 5, Issue 11, Nov. 2018, 8 pages.

"What is Azure Video Indexer?," available at https://docs.microsoft.com/en-us/azure/azure-video-indexer/video-indexer-overview, Microsoft Docs, Microsoft Corporation, Redmond, WA, Jun. 9, 2022, 9 pages.

Vaswani, et al., "Attention is All You Need," arXiv, Cornell University, arXiv:1706.03762v5 [cs.CL], Dec. 6, 2017, 15 pages.

Devlin, et al., "BERT: Pre-training of Deep Bidirectional Transformers for Language Understanding," arXiv, Cornell University, arXiv:1810.04805v2 [cs.CL], May 24, 2019, 16 pages.

Ren, et al., "Faster R-CNN: Towards Real-Time Object Detection with Region Proposal Networks," arXiv, Cornell University, arXiv:1506.01497v3 [cs.CV], Jan. 6, 2016, 14 pages.

Brown, et al., "Language Models are Few-Shot Learners," arXiv, Cornell University, arXiv:2005.14165v4 [cs.CL], Jul. 22, 2020, 75 pages.

\* cited by examiner

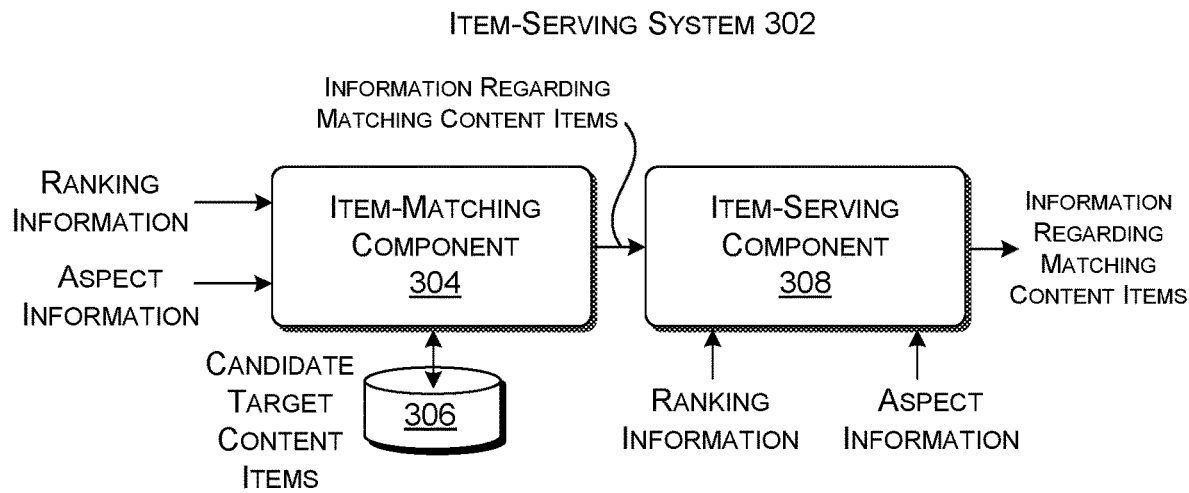
FIG. 3
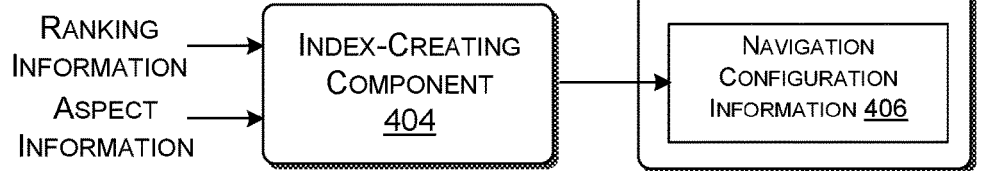
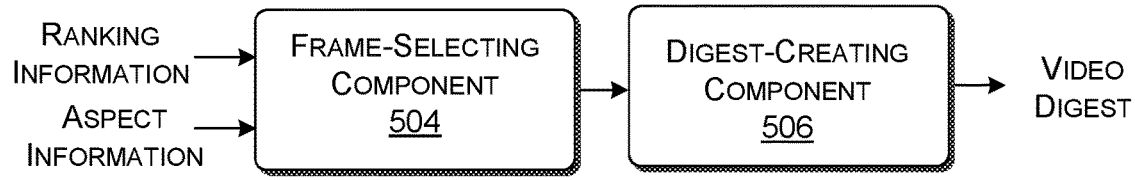
FIG. 4
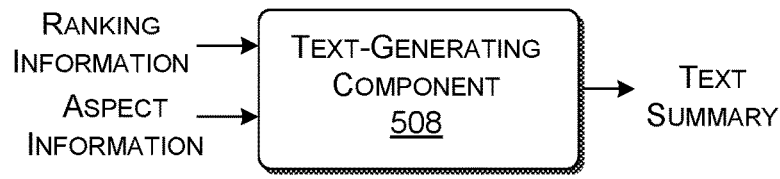
FIG. 5

OVERVIEW OF OPERATION OF THE VIDEO-PROCESSING SYSTEM 1302

RECEIVE THE VIDEO INFORMATION, THE VIDEO INFORMATION INCLUDING PLURAL VIDEO FRAMES.
1304

GENERATE PLURAL FEATURES THAT DESCRIBE THE VIDEO INFORMATION USING MACHINE-TRAINED LOGIC, THE MACHINE-TRAINED LOGIC INCLUDING AN OBJECT-TRACKING MODEL THAT IDENTIFIES PLURAL OBJECTS IN THE VIDEO INFORMATION AND THAT TRACKS THE PLURAL OBJECTS OVER THE PLURAL VIDEO FRAMES.
1306

PRODUCE PLURAL INSTANCES OF OBJECT-SPECIFIC FEATURE INFORMATION FOR THE PLURAL OBJECTS BASED ON THE PLURAL FEATURES THAT HAVE BEEN GENERATED, EACH INSTANCE OF OBJECT-SPECIFIC FEATURE INFORMATION DESCRIBING AN OBJECT OF THE PLURAL OBJECTS.
1308

PRODUCE RANKING INFORMATION THAT DETERMINES PROMINENCE OF EACH OBJECT OF THE PLURAL OBJECTS IN THE VIDEO INFORMATION BASED ON THE PLURAL INSTANCES OF OBJECT-SPECIFIC FEATURE INFORMATION, A PROMINENCE OF EACH OBJECT OF THE PLURAL OBJECTS BEING BASED, AT LEAST IN PART, ON AN EXTENT TO WHICH THE OBJECT APPEARS IN THE VIDEO INFORMATION.
1310

USE THE RANKING INFORMATION TO CONTROL PRESENTATION OF THE VIDEO INFORMATION.
1312

FIG. 13

OVERVIEW OF OPERATION OF ONE KIND OF APPLICATION SYSTEM 1402

IDENTIFY A PARTICULAR OBJECT IN THE CLASS OF OBJECTS HAVING A RANK, AS ESTABLISHED BY THE RANKING INFORMATION, THAT SATISFIES A PRESCRIBED CRITERION.
1404

IDENTIFY A PARTICULAR CONTENT ITEM THAT MATCHES THE PARTICULAR OBJECT FROM A DATA STORE OF CONTENT ITEMS.
1406

PRESENT INFORMATION REGARDING THE PARTICULAR CONTENT ITEM DURING THE PRESENTATION OF THE VIDEO INFORMATION.
1408

FIG. 14

OVERVIEW OF OPERATION OF ONE KIND OF APPLICATION SYSTEM 1502

PRESENT A NAVIGATION CONTROL ON A USER INTERFACE PRESENTATION IN CONJUNCTION WITH PRESENTATION OF THE VIDEO INFORMATION, THE NAVIGATION CONTROL HAVING NAVIGATION SELECTION OPTIONS THAT ARE DETERMINED, AT LEAST IN PART, BASED ON THE RANKING INFORMATION.
1504

RECEIVE A SIGNAL THAT INDICATES THAT INTERACTION WITH THE NAVIGATION CONTROL HAS OCCURRED.
1506

NAVIGATE TO A LOCATION IN THE VIDEO INFORMATION BASED ON THE SIGNAL THAT HAS BEEN RECEIVED.
1508

FIG. 15

DETECTING PROMINENCE OF OBJECTS IN VIDEO INFORMATION

BACKGROUND

Developers may choose from a variety of machine-trained models to analyze video information. For instance, a developer can use a machine-trained model to detect and track objects in the video information. The use of machine-trained models by itself, however, does not always enable a user to efficiently interact with the video information. Indeed, the use of machine-trained models can increase the consumption of computing resources, and/or can provide an overabundance of detailed information that ultimately prevents a user from efficiently interacting with the video information.

SUMMARY

A computer-implemented technique is described herein that uses machine-trained logic to detect and track people that appear in video information. The technique then ranks the prominence of these people in the video information, to produce ranking information. The prominence of each person depends, at least in part, on an extent to which the person appears in the video information. In some implementations, one or more application systems make use of the ranking information to control the presentation of the video information.

According to one illustrative aspect, the technique generates the ranking information by using the machine-trained logic to produce features that describe the video information. The technique then produces plural instances of person-specific feature information for the people based on the features. Each instance of person-specific feature information describes a particular person, and is produced by accumulating features pertaining to this person over the video frames. The technique then ranks the people based on the plural instances of person-specific video information.

According to another illustrative aspect, an application system uses the ranking information to identify a person that has at least a prescribed rank. The technique then presents information on a user interface presentation that pertains to the person. For instance, in some implementations, the technique displays information regarding a product that the person is using, wearing, standing in proximity to, etc. Another application system uses the ranking information to facilitate navigation within the video information. Another application system uses the ranking information to produce a summary of the video information.

More generally, in some implementations, an application system leverages the ranking information to enable a user to efficiently interact with the video information. For instance, the application system uses the ranking information to narrow a focus of interest within the video information. This, in turn, enables the application system to reduce the amount of information that is retrieved and served to the user in the course of the presentation of the video information. In other contexts, the application system uses the ranking information to more efficiently find and consume content within the video information.

While the technique has been summarized above in the context of the ranking of the prominence of people in video information, the technique is applicable to determine ranking information for any specified class (or classes) of objects, such as animals, landmarks, vehicles, and/or geographical features.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 shows a first illustrative application of ranking information produced by the video-processing system of FIG. 1.

FIG. 4 shows a second illustrative application of the ranking information produced by the video-processing system of FIG. 1.

FIG. 5 shows a third illustrative application of the ranking information produced by the video-processing system of FIG. 1.

FIG. 13 shows a process that explains one manner of operation of the video-processing system of FIG. 1.

FIGS. 14-16 show three illustrative processes that respectively explain the operation of the application systems of FIGS. 3, 4, and 5.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative processing system for detecting prominent objects in video information, and leveraging the information regarding the prominent objects in various applications. Section B sets forth illustrative methods that explain the operation of the processing system of Section A. Section C describes illustrative computing functionality that, in some implementations, is used to implement any aspect of the features described in Sections A and B.

A. Illustrative Video-Processing System

A.1. Functionality for Generating Ranking Information

Figure 1:
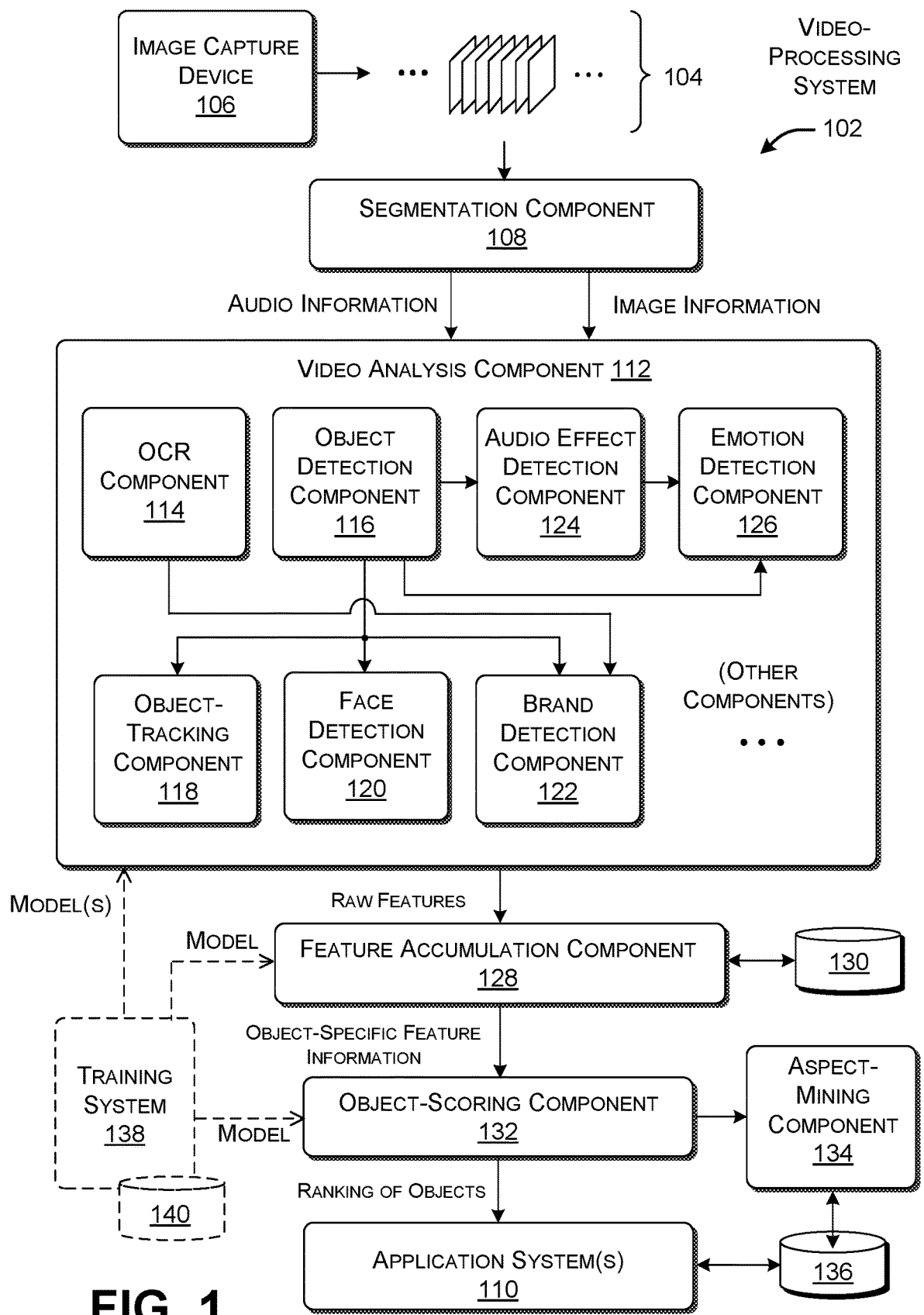
FIG. 1 shows an illustrative video-processing system for detecting prominent objects in video information.

FIG. 1 shows one implementation of a video-processing system 102 for processing video information. The video information 104 is made up of a series of video frames. The video information 104 ultimately originates from at least one image capture device 106. In some implementations, the entity that captures the video information 104 is the same as or different from the entity that processes it using the video-processing system 102. For example, in one scenario, a user uses the video-processing system 102 to process video information 104 he or she has recorded. In another scenario, a user or developer uses the video-processing system 102 to process a publicly-available video. In some implementations, the video information 104 includes at least visual (e.g., image) information and audio information. In other implementations, the video information 104 includes just visual information. A segmentation component 108 extracts the audio information and the visual information from the video information 104.

The remainder of the functions performed by the video-processing system 102 are directed to the principal goal of ranking the prominence of objects of a particular class (or classes) that appear in the video information 104. A particular or predetermined class refers to a class that is defined by a developer or other entity in advance based on any factor(s); the same applies to other uses of the term predetermined in other contexts. For illustrative purposes, the description of objects below will generally be provided in terms of different people that appear in the video information. However, the same processing can be performed with respect to other class(es) of objects, or combinations of classes of objects, such as animals, landmarks, geographic features, products, and/or vehicles. The ranking yields ranking information. One or more application systems 110 use the ranking information to control the presentation of the video information 104.

For example, one application system retrieves content items, such as images and/or video, which are related to characteristics of the people that prominently appear in the video information 104. The application system presents information regarding the content items on a user interface presentation in conjunction with the presentation of the video information 104. Alternatively, or in addition, the application system sends the information to any other target destination(s), such as a storage device, a remote computing device, or a remote presentation device (where "remote" refers to a location of the target destination relative to a current location of a user). In some implementations, a content item corresponds to an image (e.g., a photograph), a video item, a link to any resource item, an audio item, etc., or any combination thereof. For example, a content item may correspond to a static digital advertisement, a video commercial, an audio commercial, etc. Another application system uses the ranking information to configure navigation selection options in a navigation control that is presented on the user interface presentation. The application system receives a selection (e.g., a user's selection) of one of one of the navigation selection options to navigate to a corresponding bookmarked location in the video information 104. Another application system uses ranking information to generate and present a summary of the video information 104. Additional information regarding these three applications will be provided below in Subsection A.2. These three applications are illustrative; other application systems can leverage the ranking information in other ways not summarized above.

In some implementations, the video-processing system 102 produces the ranking information as a backend process based on the video information 104 that has already been captured in its entirety and provided to the video-processing system 104 in its entirety. For example, one or more servers generate the ranking information for the entire batch of video frames as part of a more encompassing indexing task performed on the video information 104. In a separate application phase, the application system(s) 110 makes use the ranking information to control the presentation of the video information 104. Each application system can be implemented by the same entity as the entity(ies) that produce the ranking information, or a different entity. Each application system can perform its operations at the same site that generates the ranking information or at a different site, or a combination thereof.

In other implementations, the video-processing system 102 dynamically generates the ranking information in the course of the presentation or of the video information 104 or other type of processing of the video information 104. In some implementations, for instance, the video-processing system 102 dynamically generates the ranking information as the video information 104 is being captured by a capture device, and/or as the video information 104 is being received (e.g., as the video information 104 is being downloaded from a remote source). Here, the ranking information does not exist prior to the capture and/or receipt of the video information. To facilitate explanation, however, most of the examples presented below will assume that a backend process produces the ranking information in advance of the presentation of the video information.

In some implementations, the application system(s) 110 include preexisting presentation functionality that allows a user to interact with the video information 104. The application system provides the added ranking functions described above as an add-on service that integrates with the preexisting presentation functionality. The preexisting presentation functionality and the add-on service can be produced by the same entity or different respective entities.

The video-processing system 102 improves the efficiency at which the application system(s) 110 perform their respective tasks. For instance, in some implementations, with respect to the content-serving example, an application system identifies a narrowly-focused set of content items that are likely to be well-attuned to a focus of interest as the video information 104 plays. This result, in turn, will reduce the need for the application system to retrieve a larger number of less relevant content items, which reduces the consumption of computing resources (e.g., memory usage).

It will also facilitate the user's interaction with the video information 104, as the user will not be overwhelmed by the application system with a large number of content items of low relevance as the user watches the video information 104. With respect to the navigation example, in some examples, an application system allows the user to more efficiently advance to a part of the video information 104 of interest. This result also reduces the consumption of computing resources, as the user does not need to watch parts of the video information 104 in which he or she is not interested. Nor does the user need to move forward and backward through the video information 104 in manual fashion to locate a point of interest in the video information 104. An application system that uses the ranking information to produce a video summary provides similar benefits to the navigation example. To facilitate explanation, the following disclosure will describe each application as a single integrated service, even though, as stated above, a single application system can incorporate plural functions that are implemented by different respective entities.

With the above introduction, the following explanation describes how the video-processing system 102 generates the ranking information. As a first phase, a video analysis component 112 uses machine-trained logic, including at least one machine-trained model, to generate features that describe different aspects of the video information 104. A feature refers to a characteristic of information (e.g., video information, image information, and/or audio information) that can be extracted by an analysis engine of any type. In some implementations, the machined-trained model(s) are implemented by one or more network-accessible services. For instance, in some implementations, the machine-trained models correspond to logic provided by MICROSOFT AZURE, a cloud computing platform provided by MICROSOFT CORPORATION of Redmond, Washington. In some implementations, the video analysis component 112 accesses the machine-trained models over the Internet or other computer network using application programming interfaces (APIs) provided by the cloud computing platform. Alternatively, or in addition, one or more of the machine-trained models correspond to logic that is local with respect to other functions performed by the video-processing system 102.

Examples of the different types of machine-trained models used by the video analysis component 112 will be described below. Other implementations use additional machine-trained models not described below, and/or can omit one or more machine-trained models described below. For example, some implementations include an action-detection component that detects when a person performs a prescribed action in the video information 104. Alternatively, or in addition, some implementations omit the an audio effect detection component 124 and/or an emotion detection component 126. Alternatively, or in addition, some implementations omit a brand detection component 122. Alternatively, or in addition, some implementations omit a face detection component 120. FIG. 1 shows illustrative information flows between individual machine-trained models. Subsection A.3 (below) provides additional details regarding illustrative machine-trained models that can be used to implement any part of the video analysis component 112.

An optical character reader (OCR) component 114 performs optical character recognition on individual frames of the video information 104. The OCR component 114 can perform this task in different ways. In one approach, the OCR component 114 generates feature information that describes the image content provided by each frame of the video information 104. The OCR component 114 then maps the feature information to recognized characters using any statistical model or machine-trained model, such as a Hidden Markov Model (HMM).

An object detection component 116 detects objects in the frames of the video information 104. In some implementations, the object detection component 116 detects objects of interest (such as people) in each individual frame by generating plural candidate bounding boxes that encompasses different respective regions of the frame. The object detection component 116 uses machine-trained logic to determine, for each class of objects of interest, the probability that each candidate bounding box includes an object of this class. In some implementations, the object detection component 116 uses Convolutional Neural Network (CNN) technology to perform these functions.

An object-tracking component 118 tracks detected objects over the course of the frames of the video information 104. In some implementations, the object-tracking component 118 performs this function by generating candidate trajectories, e.g., using a Kalman filter. The object-tracking component 118 then associates objects detected by the object detection component 112 with the candidate trajectories, e.g., using the Hungarian algorithm.

The face detection component 120 determines the identities of the people who appear in the video information 104 by recognizing their faces. For instance, in some implementations, the face detection component 120 determines whether any of the individuals that appear in the video information 104 have been previously identified as public persons, such as celebrities, or politicians. In some implementations, the face detection component 120 performs this function by identifying all unique faces that appears in the video information 104, as recognized by the object detection component 116. For each such face, the face detection component 120 uses machine-trained logic to generate feature information associated with the face. The face detection component 120 then maps the feature information to a distributed source face vector in a low-dimensioned vector space. The face detection component 120 then determines whether the source face vector is a match for any target face vector associated with a public person, as previously computed and stored in a target vector data store (not shown). In some implementations, the face detection component 120 searches the target vector data store using any technique, such as the Approximate Nearest Neighbor (ANN) technique. The face detection component 120 assesses the similarity between two vectors using any distance metric, such as cosine similarity. This approach is merely illustrative; other implementations can use other techniques to determine the identities of people in the video information 104. General background information on the stand-alone topic of face detection can be found in WANG, et al., "Deep Face Recognition: A Survey," arXiv, Cornell University, arXiv: 1804.06655v9 [cs.CV], Aug. 1, 2020, 31 pages.

The brand detection component 122 detects whether any of the frames of the video information 104 contain image content that is associated with one or more brands. In some implementations, the brand detection component 122 performs this function, in part, by comparing words recognized by the OCR component 114 to a dictionary of known brand names. In addition, or alternatively, the brand detection component 122 determines whether logo information is present in any of the frames of the video information 104. In some implementations, the brand detection component 122 performs this function using the same matching technology as the face detection component 120, but here applied to logos instead of faces. More specifically, in some implementations, the object detection component 116 identifies candidate objects that correspond to logos in the frames. For each such candidate object, the brand detection component 122: (1) generates feature information that describes the object; (2) maps the feature information into a source logo vector; and (3) determines whether the source logo vector matches any precomputed target logo vector that is associated with a known logo (and associated brand).

The audio effect detection component 124 determines whether the audio information associated with the video information 104 includes predetermined audio effects. Each audio effect indicates that something of interest may be happening during the occurrence of the audio effect. Different applications can choose a custom set of audio effects to be monitored. For instance, some audio effects that can be monitored include various crowd reactions, such as clapping, cheering, laughter, and/or gasps. Alternatively, or in addition, the audio effects are associated with certain words that are spoken by people that appear in the video information 104. The audio effect detection component 124 bookmarks each occasion in which a predetermined audio effect occurs in the presence of a person in the video information 104, as detected by the object detection component 116. In some implementations, the audio effect detection component 124 detects sounds using an Automatic Speech Recognition (ASR) system, but here configured to detect non-verbal sounds as well as words. In operation, the audio effect detection component 124 produces a feature vector based on audio information that is part of the video information 104, and then uses any machine-trained classification model to classify the sound(s) described by the feature vector.

The emotion detection component 126 determines whether prescribed positive and/or negative emotions have been exhibited in the video information 104. Detection of a positive emotion in the video information 104 provides evidence that whatever is happening in a scene, contemporaneously with the detected positive emotion, is pleasing. Positive emotions, for example, include happiness, excitement, astonishment, amusement, etc. In some implementations, detection of a negative emotion in the video information 104 is used to downgrade the prominence of individuals who appear in the video information 104 at the same times that these negative emotions are detected. Negative emotions, for example, include sadness, anger, fear, boredom, etc.

The emotion detection component 126 detects emotions of interest by determining whether the audio information contains predetermined sounds indicative of these emotions. For the case of positive emotions, these sounds include laughter, gasps, etc. For the case of negative emotions, these sounds include crying, sighing, yawning, etc. In some implementations, the emotion detection component 126 detects the predetermined sounds based on signals provided by the audio effect detection component 124. Alternatively, or in addition, the emotion detection component 126 determines whether the faces and/or bodies detected by the object detection component 116 exhibit predetermined gestures indicative of emotions of interest. For the case of positive emotions, these gestures include smiling, raising eyebrows (indicative of astonishment), clapping hands, waving arms, etc. For the case of negative emotions, these gestures include frowning, crying, yawning, etc. In some implementations, the emotion detection component 126 detects these gestures using the same kind of vector-matching technology described above.

Altogether, the video analysis component 112 produces a collection of raw feature information. Some of this raw feature information originates from analysis of the visual (image) information, while other raw feature information originates from analysis of the audio information. Still other raw feature information derives from joint analysis of the visual and audio information.

A feature accumulation component 128 accumulates sets of raw features produced by the video analysis component 112 on a per-object basis over the video frames of the video information 104. The feature accumulation component 128 produces plural instances of object-specific information based on the respective object-specific sets of features. The examples presented herein emphasize the case in which the objects of interest are people. In this context, the feature accumulation component 128 generates plural sets of person-specific features and plural corresponding instances of person-specific feature information. For instance, consider the case in which the video information 104 includes three prominently-appearing people. The feature accumulation component 128 produces a first instance of person-specific feature information for the first person, a second instance of feature-specific information for the second person, and a third instance of feature-specific information for the third person.

Different implementations of the video-processing system 102 can use different kinds of feature information to reveal prominent people. The following is an example listing of feature information used by one implementation of the video-processing system 102. In some implementations, any instance of person-specific feature information, associated with a particular person, expresses any combination of the following instances of feature information:

Frequency of appearance. A first instance of person-specific feature information describes the fraction of frames in which a particular person appears in the video information 104, with respect to a total number of frames in the video information 104. The feature accumulation component 128 computes this kind of feature information based on at least information provided by the object detection component 116, the object-tracking component 118, and the face detection component 120.

Relative size. A second instance of person-specific feature information provides a statistical measure that indicates how big the appearance of the person is over the course of the frames of the video information 104. In some implementations, the feature accumulation component 128 computes this measure by registering the size of each bounding box in each frame in which the person appears, divided by the size of the frame as a whole. The feature accumulation component 128 then generates the average (or some other statistical summary) of this measure over all of the frames in which the person appears.

Public person status. A third instance of person-specific information describes whether the face detection component 120 concludes that the person under consideration is on a list of public people. This instance of person-specific feature information can also provide a measure of the degree of fame of this person, such as an indication of the number of followers this person has on a social media site, the number of mentions this person has received on a social media site, the number of works that this person has produced, the number of awards that this person has received, the sports record of this person, and so on. More generally, the third instance of person-specific information describes whether an object under consideration has a particular status, where a particular status is a status that is defined by any entity in advance based on any factor(s). Public person status is just one example of a predetermined status.

Brand name co-occurrence. A fourth instance of person-specific feature information describes an extent to which the person of interest appears in conjunction with brand-related information, such as a logo and/or company name. In some implementations, the feature accumulation component 128 computes this information based on any of, for example: a number of frames in which the person appears together with the brand-related information; a size of the brand-related content in each of the frames in which the person appears; the proximity of the person to the brand-related information in each of the frames in which the person appears; whether the person is engaging in behavior that pertains to the brand-related information. The person can interact with the brand-related information by mentioning it. Alternatively, or in addition, the person can interact with the brand-related information by wearing a piece of clothing on which the brand-related information appears, holding a product on which the brand-related information appears. Of less significance are those occasions in which the brand-related information appears in the background of a scene in which the person appears, such as on the name of a building by which the person walks.

The feature accumulation component 128 computes brand-related person-specific information on any level of specificity. For example, in some implementations, the feature accumulation component 128 identifies the number of times that the person has appeared in conjunction with each particular brand. The person's association with some brands may be more significant than the person's association with other brands, depending on the marketing objectives of the entity that is collecting this information.

Audio effect co-occurrence. A fifth type of person-specific feature information describes an extent to which the person of interest appears in conjunction with certain audio effects, such as the clapping or laughter of an audience. In some implementations, the feature accumulation component 128 computes this information based on any of, for example: a number of frames in which the person appears together with the predetermined audio effects; a volume level of the audio effects in those frames in which the person appears, etc.

Target emotion co-occurrence. A sixth type of person-specific feature information describes an extent to which the person of interest appears while one or more emotions of a particular kind (or kinds) are being exhibited. The video information 104 can exhibit these emotions in its audio information through predetermined sounds, words, etc., and in its visual information through predetermined gestures, facial expressions, etc. In some implementations, the feature accumulation component 128 computes this aspect of person-specific feature information based on any of, for example: a number of frames in which the person appears together with at least one predetermined emotion; an extent to which the emotion is exhibited in each frame in which the person appears; an extent to which the person of interest is exhibiting the emotion himself or herself; an extent to which one or more people other than the person of interest are exhibiting the emotion in the video information 104. As to the last-mentioned factor, in some implementations, the feature accumulation component 128 surmises that the emotion is directed at or otherwise triggered by a particular person based on, for example: evidence that the emotion is exhibited upon the arrival of the particular person; evidence that the emotion is elicited by an action taken by the particular person; evidence that the emotion is being exhibited by one or more people heard and/or seen in the video information 104 with whom the person of interest is communicating or for whom the person of interest is performing.

The feature accumulation component 128 stores the person-specific information in a data store 130 in any level of particularity. For example, the feature accumulation component 128 stores the above-described types of feature-specific information for each person. In some implementations, the feature accumulation component 128 also stores information that reveals any nexus between separate dimensions of feature-specific information. For example, in some implementations, the feature accumulation component 128 stores information that identifies those occasions in which the person's appearance in a frame is above a prescribed size (relative to the entire size of the frame), and in which a particular audio effect and/or emotion are present.

An object-scoring component 132 generates a score that reflects the prominence of each person identified by the video analysis component 112. The object-scoring component 132 computes this score based at least on the person's person-specific feature information. In some implementations, the object-scoring component 132 computes the score for a person of interest as a weighted sum of the features associated with the person, obtained from the person's person-specific feature information (e.g., wherein the features include aspects such as frequency of appearance, relative size, and/or public person status). In some implementations, the weights of this weighted sum is manually selected by a developer.

Alternatively, or in addition, a machine-trained model of any type maps a feature vector that expresses a person's instance of person-specific feature information to a score. The machine-trained model performs this task using a set of machine-trained weights produced in a prior training process. Illustrative types of machine-trained logic that can perform this function include, for example: a Convolutional Neural Network (CNN) coupled with a top-level classification module (such as a Softmax component), a Support Vector Machine (SVM) model, a decision tree or random forest model, a logistic regression model, a transformer-based encoder coupled with a top-level classification module (such as a Softmax component).

The object-scoring component 132 can formulate a feature vector for a particular person in different ways. For example, in some implementations, the feature vector expresses quantitative information, such as the percentage of the frames in which the person appears, the average size of the person's appearance in those frames, etc. The feature vector also expresses co-occurrence information, such as by providing measures that indicate how many times the person appears in conjunction with particular audio effects, particular emotions, particular brand-related content, etc.

Altogether, the object-scoring component 132 produces ranking information based on the computed scores. The ranking information establishes an order of people that appear in the video information 104, e.g., from most prevalent to least prevalent, or vice versa. The object-scoring component 132 optionally truncates this list by removing people having scores below a prescribed environment-specific threshold value. Alternatively, or in addition, the object-scoring component 132 provides ranking information for the N most prominent individuals who appear in the video information 104, where N is a configurable parameter.

Different implementations can fine-tune what constitutes a "prominent" individual, and how to capture prominence, as so defined, via particular features. In general, the prominence of an individual in video information 104 measures the expected capacity of that person in the video information 104 to draw a viewer's attention, which, in turn, depends on at least an extent to which the person appears across the frames of the video information 104. A person who is expected to draw a viewer's attention can also be considered an important person.

An optional aspect-mining component 134 extracts characteristics of interest pertaining to the most prominent people in the video information 104, beyond that conveyed by the instances of person-specific feature information. The aspect-mining component 134 stores information regarding these characteristics in a data store 140. The aspect-mining component 134 can perform this task in different ways. For instance, in some implementations, the aspect-mining component 134 stores metadata associated with the most prominent people, such as their names. In addition, in some implementations, the aspect-mining component 134 includes machine-trained logic that performs further processing on the video information 104. For instance, in some implementations, the aspect-mining component 134 maps image content associated with a prominent person to one or more distributed vectors in semantic space. In addition, in some implementations, the aspect-mining component 134 extracts bookmark information that identifies the junctures at which the most prominent people appear in the video information 104, such as by storing the frame numbers at which each of the most prominent people appear. In other implementations, at least some of the functions of the aspect-mining component 134 are delegated to one or more application systems.

A training system 138 produces one or more machine-trained models that govern the operation of any of the subcomponents of the video analysis component 112, the feature accumulation component 128, the object-scoring component 132, and/or the aspect-mining component 134. A machine-trained model is implemented by machine-trained weights and bias values that govern the operation of processing functionality having a particular architecture (e.g., a CNN-based architecture, a pt transformer-based architecture). The training system 138 performs its training task by iteratively generating the weights and bias values in the course of processing a plurality of training examples in a data store 140. The training system 138 uses any technique(s) to perform training, such as stochastic gradient descent in conjunction with back projection.

Alternatively, or in addition, the training system 138 trains at least one machine-trained model that performs the functions of two or more of the individual components shown in FIG. 1, such as the feature accumulation component 128 and the object-scoring component 132. Indeed, in some implementations, the training system 138 trains one end-to-end model that performs all or most of the functions of the video-processing system 102.

Consider an illustrative training operation that is be used to train model(s) that implement the feature accumulation component 128 and the object-scoring component 132. In some implementations, the training dataset in the data store 140 includes a plurality of instances of video information, together with manually-supplied labels that identify the N most prominent people who appear in each instance of the video information. The training system 138 iteratively adjusts the parameter values of the machine-trained model(s) to successively increase the accuracy at which the feature accumulation component 128 and the object-scoring component 132 correctly predict the most prominent people in the instances of video information in the data store 136. The training system 138 uses any loss function to measure the discrepancies between predictions and ground-truth labels, such as a cross entropy loss function.

Figure 2:
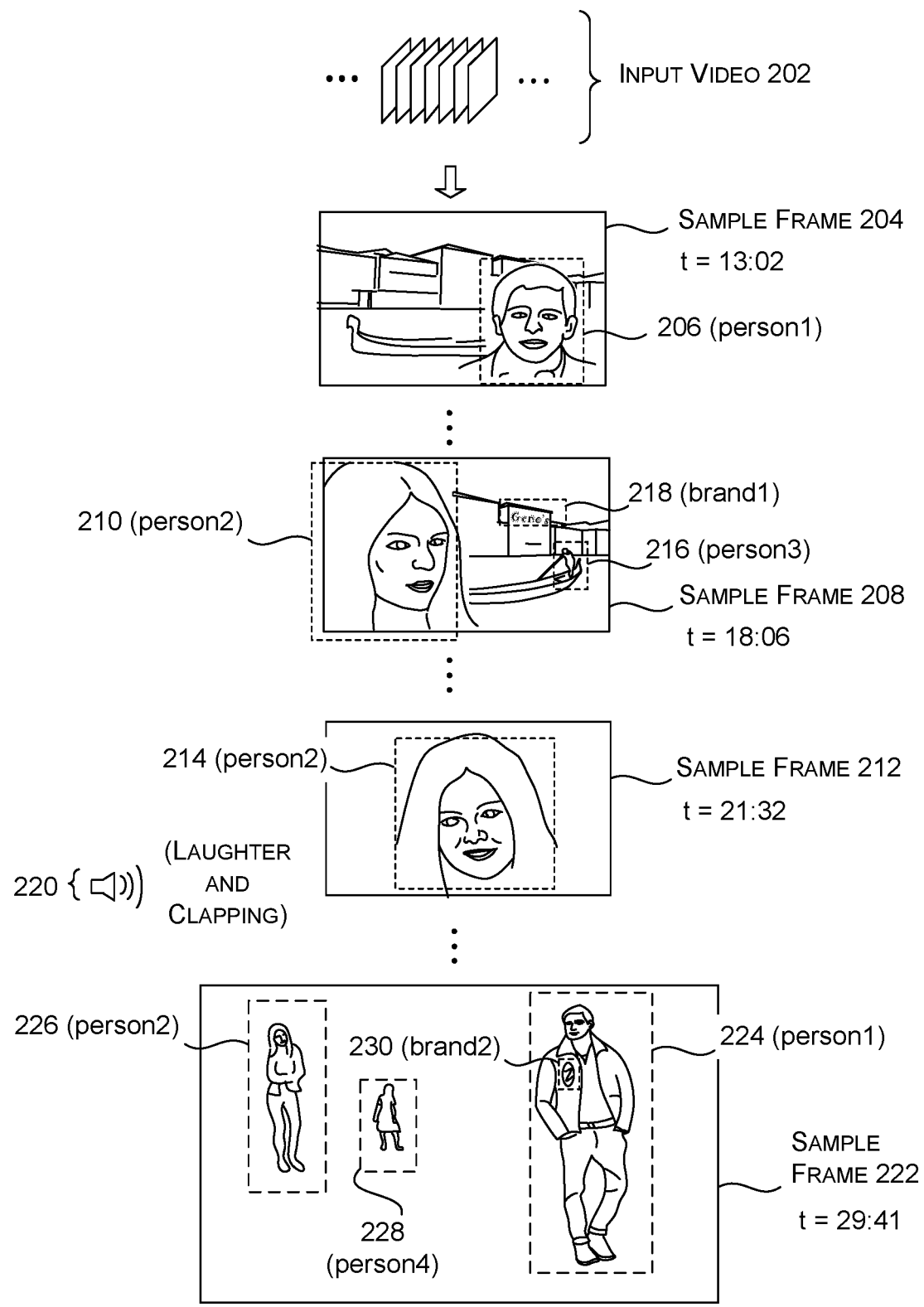
FIG. 2 shows an example of four video frames in an instance of video information. The video frames include illustrative objects of interest.

Advancing to FIG. 2, this figure shows input video information 202 that corresponds to a publicly-released movie or video, or a personal (e.g., "home") video produced by a user. For instance, assume here that the video information 202 is a movie or television program set in the Italian city of Venice that prominently features at least two celebrity actors, a male actor ("person1") and a female actor ("person2"). The video frames shown in FIG. 2 occur at different times in the movie.

A first sample frame 204 includes a bounding box 206 produced by the object detection component 116 that encompasses an image of the male actor. Here, the male actor's appearance takes up a significant portion of the overall size of the frame. A second sample frame 208, occurring at some time after the first sample frame 204, includes a bounding box 210 that encompasses an image of the female actor. Here, the female actor's appearance takes up an even larger portion of the frame than is the case in the first sample frame 204. The same statements apply to a third sample frame 212 that includes a bounding box 214 that encompasses an image of the female actor. Further note that the object detection component 116 works in conjunction with the face detection component 120 to determine that both the male actor and the female actor are famous celebrities (with respect to a predetermined list that defines who is considered "famous").

Note that the object detection component 116 also produces a bounding box 216 that includes what will ultimately prove to be a person ("Person3") of low prominence. For instance, in some implementations, this person corresponds to someone in the background of a scene that is not relevant to the scene. Further, the object detection component 116 working in conjunction with the brand detection component 122, produces a bounding box 218 that is associated with a brand name, that is, a company named "Geno's Pizza." Further, the object detection component 116 working in conjunction with the face detection component 120 and the emotion detection component 126 determines that the female actor is exhibiting a positive emotion in the second and third sample frames (208, 212), e.g., by smiling or laughing. Finally, the audio effect detection component 124 determines that the appearance of the female actor in the third sample frame 212 is accompanied by a sound effect 220 that is of interest, here the laughter and clapping of a studio audience or crowd not shown in the frame 212 itself.

A final sample frame 222 includes bounding boxes (224, 226, 228) produced by the object detection component 116 that respectively enclose images of the male actor, the female actor, and a background individual ("Person4") who will prove to be of low overall prominence in the video information 202. The object detection component 116 also works in conjunction with the brand detection component 122 to detect that the male actor is wearing a jacket that is marked by a company logo. A bounding box 230 encloses an image of the logo.

Assume that the object-scoring component 132 ultimately concludes that there are five individuals in the video information 202 that have a prominence score above a prescribed threshold. Assume that the female actor is the most prominent individual and the male actor is the second-most prominent individual. The aspect-mining component 134 will capture additional information associated with each of these individuals, such as metadata and/or distributed vectors.

To repeat, while the video-processing processing system 102 has been described above in the context of ranking the prominence of people in the video information 104, the principles set forth herein can be used to rank the prominence of any class or classes of objects, events, etc. A developer can select a custom set of features to assess prominence for each class of objects. Some of the features described above (such frequency of appearance, relative size, or audio effect co-occurrence) will apply to many classes of objects, while other features (such as a public person status) apply more narrowly to human beings.

A.2. Functionality for Applying the Ranking Information

FIG. 3 shows one implementation of a first application system that makes use of the ranking information produced by the video-processing system 102. The first application system is an item-serving system 302 that serves content items (e.g., images, video item, links, and/or audio items) to an end user as the user watches the video information 104. The content items are chosen such that they have a bearing on the people that appear in the video information 104 and/or other content that appears in the frames in which the people appear. In some application scenarios, the content items correspond to static digital ads and/or video commercials for products or services having some relevance to the people that appear in the video information 104 and/or to the context in which the people appear in the video information 104. In other application scenarios, the content items correspond to links to reference material or other informational resources that have a bearing on the appearance of the prominent people in the video information 104.

The item-serving system 302 includes an item-matching component 304 that receives various information regarding the video information 104, including, for example: information regarding the people that appear in the video information 104 and their respective prominence-related scores; aspect information produced by the aspect-mining component 134; any video information 104 associated with the frames in which the prominent people appear, etc. In some implementations, the item-matching component 304 generates feature information using any combination of this input information, and then uses a machine-trained model to map the feature information to one or more distributed source vectors in a semantic vector space. The item-matching component 304 then searches a data store 306 to find a set of target vectors (if any) that are closest to the source vector(s). These target vectors are computed in advance and correspond to respective target content items, such as images and/or video items. The item-matching component 304 uses any technique to perform this search, such as an ANN technique. The item-matching component 304 uses any distance metric to measure the relation between two vectors, such as cosine similarity.

An item-serving component 308 provides information regarding the matching content items to an end user as the user watches the video information 104 on the user interface presentation. The item-serving component 308 can specifically deliver the information to the user at various junctures. In one case, the item-serving component 308 delivers the information at the beginning of a viewing session. In some implementations, the information persists as the user watches the video information 104. Alternatively, the item-serving component 308 presents information regarding different target content items throughout the user's viewing session, such as by cycling through a list of top-matching content items throughout the viewing session. Alternatively, or in addition, the item-serving component 308 presents the information to the user at the end of the user's viewing session. Alternatively, or in addition, the item-serving component 308 presents information this is relevant to the content of the video information 104 that the user happens to be viewing at a current moment in time. For example, in some implementations, upon the appearance of a person identified as prominent, the item-serving component 308 serves information regarding a product associated with the person, such as information regarding a product that relates to the person's attire in the video information 104, or information regarding a product that relates to a logo that appears in the video information 104 in conjunction with the person's appearance. In some implementations, the item-serving system 302 performs this operation based on scene marker information captured by the aspect-mining component 134.

FIG. 4 shows one implementation of a second application system that makes use of the ranking information produced by the video-processing system 102. The second application system is a navigation system 402 that configures a navigation control to be presented on a user interface presentation, and that subsequently manages an end user's interaction with the navigation control.

An index-creating component 404 receives various information regarding the video information 104, including, for example: information regarding the people that appear in the video information 104 and their respective prominence-related scores; aspect information produced by the aspect-mining component 134; any video information 104 associated with the frames in which the prominent people appear, etc. The index-creating component 404 produces navigation configuration information 406 based on the input information that configures the operation of the navigation control. For instance, in some implementations, the navigation configuration information 406 specifies navigation selection options that will be presented to the user in the navigation control. As will be described below in conjunction with FIG. 6, the navigation options allow the user to move to particular frames of the video information 104.

A navigation control component 408 presents the navigation control on a user interface presentation in conjunction with the presentation of the video information 104. The navigation control component 408 also manages the user's interaction with the navigation control, e.g., by advancing to a part of the video information 104 upon the user's selection of a navigation option associated with this part.

FIG. 5 shows one implementation of a third application that makes use of the ranking information produced by the video-processing system 102. The third application system is a video summarization system 502 that produces summary information that summarizes the video information 104, and that subsequently makes the video summary information accessible to an end user via a user interface presentation.

A frame-selecting component 504 receives various information regarding the video information 104, including, for example: information regarding the people that appear in the video information 104 and their respective prominence-related scores; aspect information produced by the aspect-mining component 134; any video information 104 associated with the frames in which the prominent people appear, etc. The frame-selecting component 504 selects frames from only those scenes in which the prominent people appear. A digest-creating component 506 produces a video digest and includes the selected frames, and provides the video digest to the user in conjunction the user's presentation of the video information 104.

In addition, or alternatively, a text-generating component 508 provides any kind of textual summary of the video information 104. The text-generating component 508 can perform this task in different ways. In one approach, the text-generating component 508 uses a machine-trained model to map image information associated with bounding boxes that depict the people of interest in the video information 104 to a set of key words. After generating this set, the text-generating component 508 uses any type of machine-trained model to map these key words into a textual narrative.

Illustrative types of machine-trained models that are capable of performing this mapping function include transformer-based decoder models that operate in an auto-regressive fashion, Recurrent Neural Networks (RNNs) built based on Long Short-Term Memory (LSTM) processing units, etc. In some implementations, the text-generating component 508 produces plural candidate narratives for an instance of video information 104 under consideration. It maps each of these narratives into a distributed narrative vector (or vectors) in vector space. It also maps the image content associated with the prominent people into a distributed image vector (or vectors) in the same target vector space. The proximity of the narrative vector(s) to the image vector(s) in the target vector space provides a measure of the fitness of the narrative under consideration to the video information 104. One example of technology for producing textual narratives based on a set of images is described in commonly-assigned U.S. Pat. No. 10,083,162 by Harish Kasina, which issued on Sep. 25, 2018, and is entitled "Constructing a Narrative based on a Collection of Images."

In other implementations, the text-generating component 508 is used to modify the operation of any preexisting text-generation application. The text-generating component 508 specifically leverages the ranking information and/or aspect information to inform the preexisting text-generating application of those parts of the video information 104 that should be emphasized or dwelt upon in the textual narrative. The information generated by the video-processing system 102 therefore serves as a weighting factor that influences the operation of the preexisting text-generating application.

Figure 6:
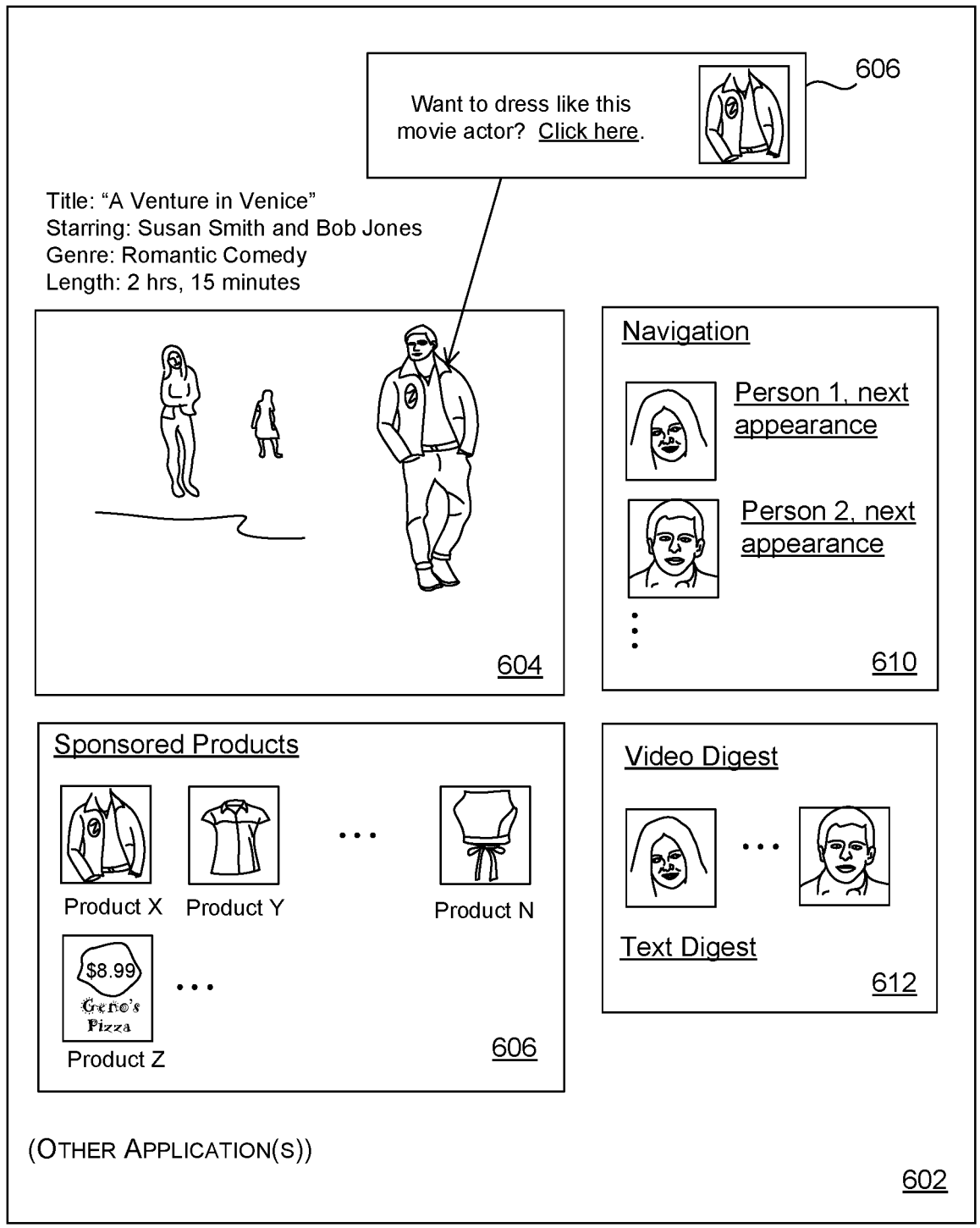
FIG. 6 shows an illustrative user interface presentation produced by one or more application systems. The application system(s) generate the user interface presentation based, in part, on the ranking information produced by the video-processing system of FIG. 1.

FIG. 6 shows a user interface presentation 602 that presents information produced by the item-serving system 302 of FIG. 3, the navigation system 402 of FIG. 4, and the video summarization system 502 of FIG. 5. In other cases, the user interface presentation 602 displays the results of only one or only two of these application systems.

A window 604 of the user interface presentation 602 displays video information 202, corresponding to the movie or television program described in FIG. 2. At the current time, the window 604 displays a particular frame of the video information 202, corresponding to the sample frame 222 described in connection with FIG. 2.

Another window 606 displays information regarding matching content items produced by the item-serving system 302 of FIG. 3. The information specifically describes images and/or video items (e.g., digital ads and/or commercials) pertaining to the clothing worn by the most prominent people in the movie. The user interface presentation 602 includes at least one other content item relating to a restaurant chain that appears in the video information 202 in connection with one or more of the prominent people (e.g., see the sample frame 208 of FIG. 2). In some implementations, the item-serving system 302 displays these content items at the outset of the presentation of the movie, and/or at one or more predetermined times during the presentation of the movie, and/or when the prominent people appear in the movie, and/or at the end of the presentation of the movie, etc. For example, upon reaching the frame in which the male actor appears wearing a particular jacket marked with a particular logo, the item-serving system 302 displays one or more content items pertaining to this item of clothing. Optionally, the item-serving system 302 presents at least one pop-up panel 608 that shows a nexus between a content item and the content being presented on a frame, e.g., by drawing a line connecting the pop-up window 606 to an item of clothing worn by the male actor. FIG. 6 shows examples in which the content items are displayed in one or more windows that are separate from the window 604 in which the video information 202 is displayed. In addition, or alternatively, the item-serving system 302 intersperses the content items with the video information 202 within a same window, e.g., as commercial breaks within the video information 202.

Alternatively, or in addition, the item-serving component 302 presents other types of content items (besides images and video items), such as digital links (not shown). Activation of a link on the user interface presentation 602 will invoke different actions in different implementations. In some implementations, activation of a link will cause a browser application to access and present a resource item (such as a web page, image, or video item) that is associated with the link. For example, in some implementations, a resource item corresponds to a web page that provides information regarding a prominent actor that appears in the input video information 202. Alternatively, or in addition, activation of a link will cause the downloading of a linked resource to a local computing device.

A window 610 displays a navigation control produced by the navigation system 402 of FIG. 4. Here, the navigation control gives the user the option to advance to a next scene containing the female actor, who has been determined to be the most prominent actor in the movie. The navigation control also gives the user the option to advance to a next scene containing the male actor, who has been determined to be the second-most prominent actor in the movie. Other implementations structure navigation operations in different ways compared to what is illustrated in FIG. 6, such as by providing a temporally-ordered listing of all of the scenes in which the prominent actors appear. In response to selecting a navigation option in the navigation control, the navigation system 402 advances to an appropriate juncture of the movie.

A window 612 allows the user to access a video digest or a text summary of the movie produced by the video summarization system 502. In some implementations, the video summarization system 502 displays the text summary in the window 612 and/or as a textual annotation that appears in the margin of the window 604, giving an experience similar to close captioning.

Although not shown in FIG. 6, any application system can present its results in audio form in conjunction with the type of visual information shown in FIG. 6, or instead of at least some of the visual information shown in FIG. 6. For example, in some implementations, the item-serving system 302 generates an audio message that invites the user to purchase the jacket that the male actor is wearing in a current scene.

The three applications described above are to be understood as illustrative. Other applications include social research applications, threat-detection applications, video-conferencing applications, etc. For instance, in some implementations, a surveillance-related application uses the above techniques to identify the prominent individuals in security footage captured by a video camera. As further stated above, other applications can identify and update a ranking of dominant people as video information is initially captured and/or received. Updating, for instance, occurs periodically or at continuously. For instance, in some implementations, a video-conferencing application uses the above techniques to steer a camera in a conference room towards principal speakers.

A.3. Example of Machine-Trained Models

Figure 7:
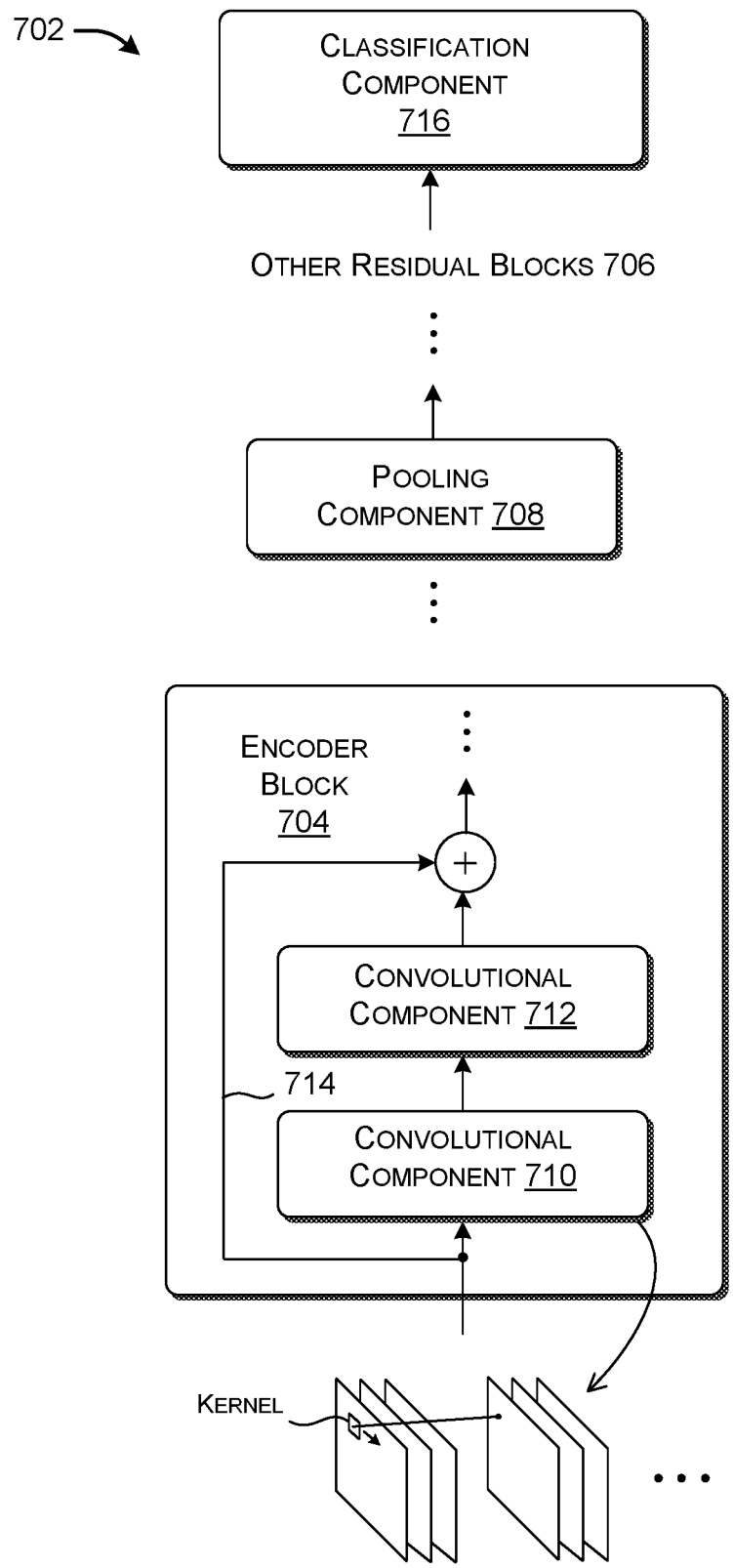
FIG. 7 shows an illustrative machine-trained model that uses convolutional neural network (CNN) technology, which, in some implementations, the video-processing system of FIG. 1 uses to produce feature information.

The remainder of Section A describes examples of machine-trained models that some implementation use to implement different components of the video-processing system 102 of FIG. 1. To begin with, FIG. 7 shows an illustrative machine-trained model 702 that uses convolutional neural network (CNN) technology. In some applications, the model 702 operates on feature information that describes text-based information. In other applications, the model 702 operates on feature information that describes image-based information. In still other applications, the model 702 operates on a combination (e.g., a concatenation) of text-based and image-based feature information.

The model 702 itself provides a pipeline that includes plural encoder blocks (e.g., encoder blocks 704, 706) optionally interspersed with pooling components, such as illustrative pooling component 708. FIG. 7 specifically shows the merely illustrative case in which the representative encoder block 704 includes a pair of convolutional components (710, 712). FIG. 7 also shows an optional residual connection 714 that adds input information fed to the first convolutional component 710 to output information produced by the second convolutional component 712.

Each convolutional component performs a convolution operation that involves moving a n×m kernel (e.g., a 3×3 kernel) across feature information supplied to the convolutional component. At each position of the kernel, the encoding subcomponent generates the dot product of the kernel values with the underlying values of the feature information. The bottom of FIG. 7 represents this convolution operation in high-level form. Each pooling component 708 downsamples results of a preceding convolutional operation using some sampling function, such as a maximum operation that selects a maximum value within a subset of values.

A classification component 716 maps logits produced by a last encoder block 706 to an output classification. In some implementations, the classification component 716 is implemented by a feed-forward neural network of any type in combination with a Softmax component (that implements a normalized exponential function).

Figure 8:
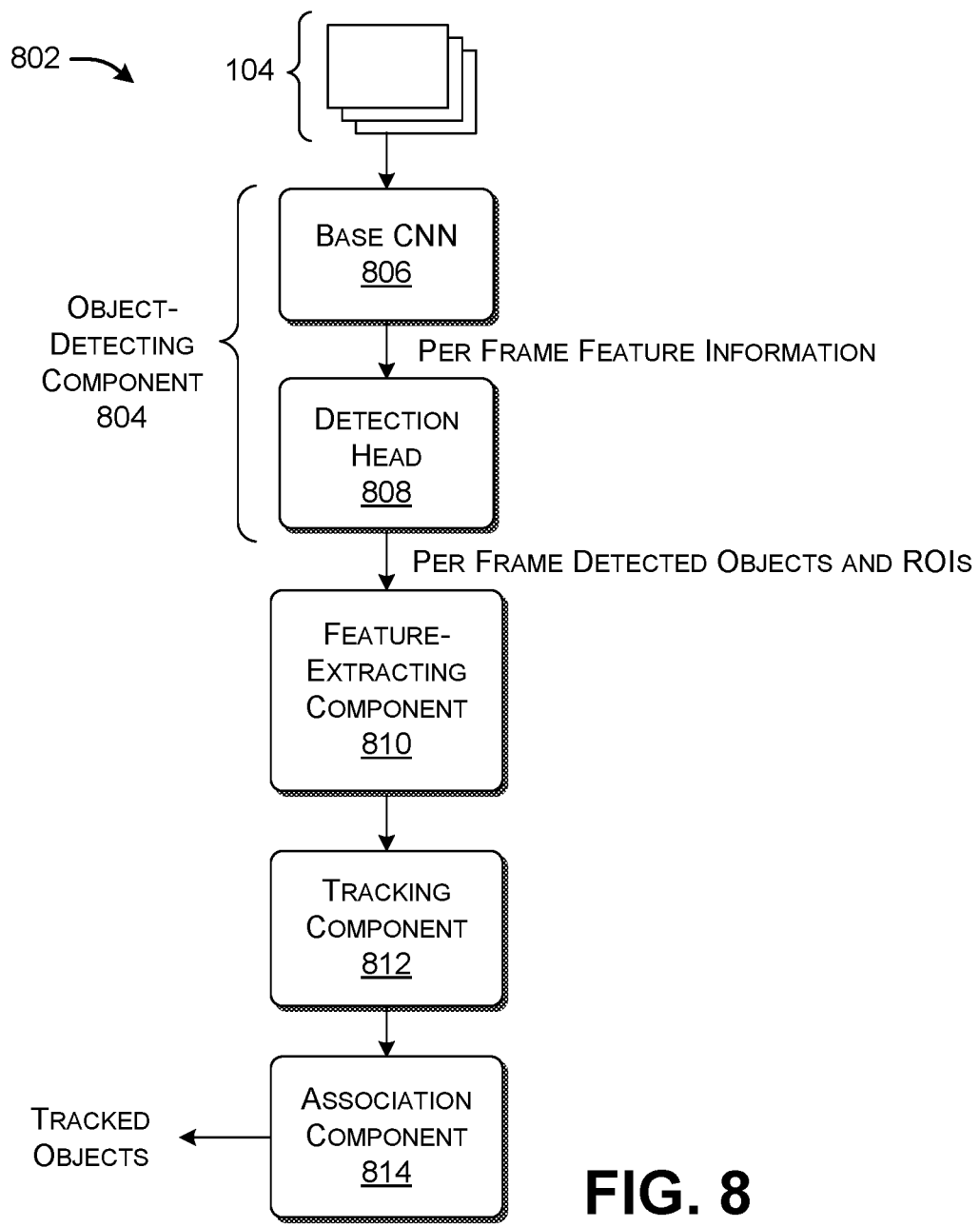
FIG. 8 shows an illustrative object-tracking component that the video-processing system of FIG. 1, in some implementations, uses to produce feature information.
Figure 9:
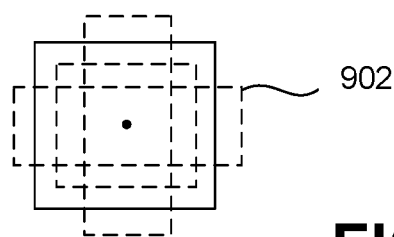
FIG. 9 shows an illustrative set of candidate bounding boxes associated with a cell in a grid of cells. The object-tracking component of FIG. 8 detects whether each of these bounding boxes includes an object of interest.

FIG. 8 one shows one implementation of an object-tracking component 802 that uses CNN technology to track objects in the video information 104. In a first phase, an object-detecting component 804 uses a base CNN 806 to convert each frame of the video information 104 into feature information. In a second phase, a detection head 808 uses CNN technology to define a plurality of candidate bounding boxes having different sizes (e.g., different aspect ratios) for each cell in a grid of cells, with respect to each frame. FIG. 9 shows candidate bounding boxes in dashed lines that are anchored with respect to a reference position of an illustrative cell 902 in a grid (not shown) of cells, with respect to a particular frame. The detection head 808 determines the probabilities that each bounding box includes different kinds of objects, such as a person, a face, and/or a logo. The detection head 808 also predicts the offset of each bounding box with respect to the reference position of its cell. The detection head 808 performs the same detection analysis for all cells of a frame, to produce a plurality of candidate detections. Further, in some implementations, the detection head 808 repeats this detection analysis for plural resolutions. This operation increases the number of candidate detections and improves the ability of the detection head 808 to detect objects having different respective sizes, ranging from relatively small objects (such as human beings) to relatively large objects (such as logos on an article of clothing). In a third phase, the detection head 808 uses the non-maximum suppression algorithm to reduce the number of candidate detections.

More generally, the object-detecting component 804 can use many different techniques to detect objects in an image and to determine bounding boxes associated with those respective objects. General background information on the stand-alone topic of machine-learned object detection can be found in: REN, et al., "Faster R-CNN: Towards Real-Time Object Detection with Region Proposal Networks," arXiv, Cornell University, arXiv:1506.01497v3 [cs.CV], Jan. 6, 2016, 14 pages; LIU, et al., "SSD: Single Shot MultiBox Detector," arXiv, Cornell University, arXiv:1512.02325v5 [cs.CV], Dec. 29, 2016, 17 pages; and REDMON, et al., "You Only Look Once: Unified, Real-Time Object Detection," arXiv, Cornell University, available at arXiv: 1506.02640v5 [cs.CV], May 9, 2016, 10 pages.

A feature-extracting component 810 detects features for each of the candidate objects identified by the object-detecting component 804. A tracking component 812 uses the detected objects and associated feature information to identify candidate trajectories of objects across the frames of the video information 104. In some implementations, the tracking component 812 performs this task using a Kalman filter. An association component 814 associates objects detected by the object-detecting component 804 with trajectories computed by the tracking component 812. In some implementations, the association component 814 performs this task using the Hungarian algorithm (e.g., the Kuhn-Mukres algorithm). This algorithm performs the assignment task using a cost matrix that describes the costs of adding the detected objects to different trajectories. Other implementations of the object-tracking component 802 merge the functions of the individual subcomponents shown in FIG. 8 together in different ways. General background information on the stand-alone topic of object tracking can be found at: CIAPARRONE, e al., "Deep Learning in Video Multi-Object Tracking: A Survey," arXiv, Cornell University, arXiv:1907.12740v4 [cs.CV], Nov. 19, 2019, 42 pages; and LUO, et al., "Multiple Object Tracking: A Literature Review," arXiv, Cornell University, arXiv:1409.7618v5 [cs.CV], Feb. 11, 2022, 49 pages.

Figure 10:
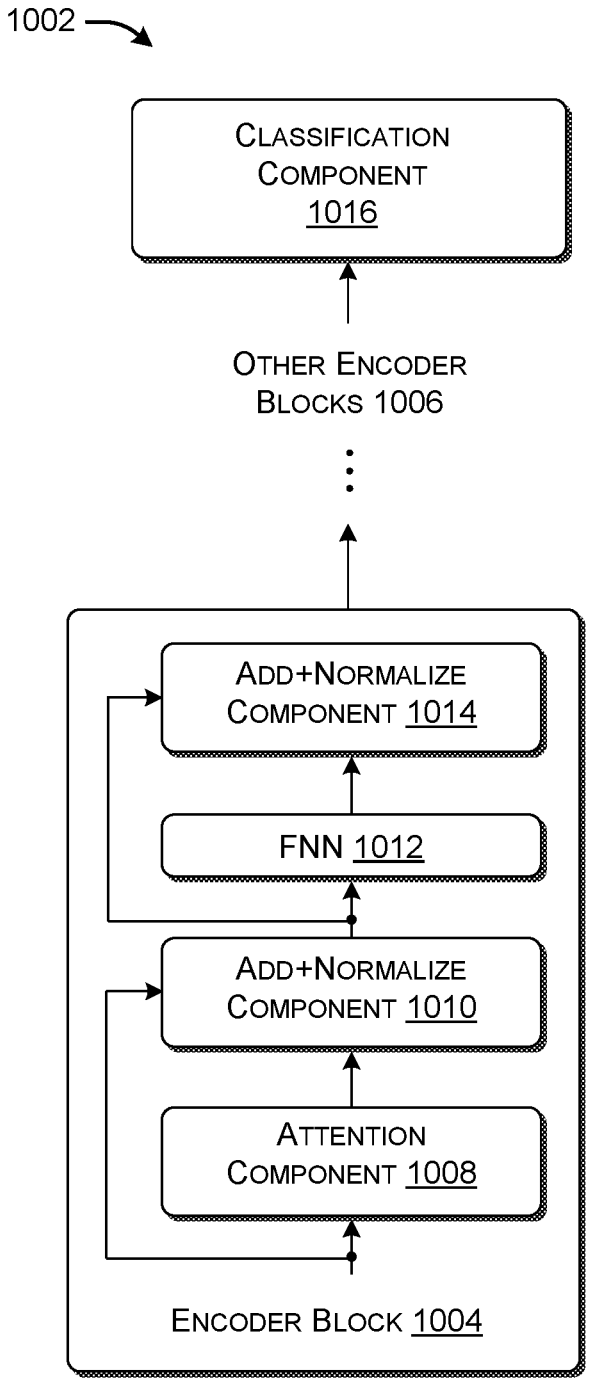
FIG. 10 shows an illustrative machine-trained model 1002 that uses transformer-based technology, which the video-processing system of FIG. 1, in some implementations, uses to produce feature information.

FIG. 10 shows a machine-trained model 1002 that uses transformer-based technology. The machine-trained model 1002 operates on feature information that describes text-based information and/or image-based information. The model 1002 provides a pipeline that includes plural encoder blocks (e.g., encoder blocks 1004, 1006). FIG. 10 shows a representative architecture of the first encoder block 1004. Although not shown, other encoder blocks share the same architecture as the first encoder block 1004.

The encoder block 1004 includes, in order, an attention component 1008, an add-and-normalize component 1010, a feed-forward neural network (FFN) 1012, and a second add-and-normalize component 1014. The attention component 1008 performs self-attention analysis using the following equation:

$$\text{Attention } (Q, K, V) = \text{Softmax}\left(\frac{QK^T}{\sqrt{d}}\right)V. \quad (1)$$

The attention component 1008 produces query information Q, key information K, and value information V shown in this equation by multiplying the input vectors fed to the attention component 1008 by three respective machine-trained matrices, $W^Q$, $W^K$, and $W^V$. More specifically, the attention component 1008 takes the dot product of Q with the transpose of K, and then divides the dot product by a scaling factor $\sqrt{d}$, to produce a scaled result. The symbol d represents the dimensionality of the machine-trained model 1002. The attention component 1008 takes the Softmax (normalized exponential function) of the scaled result, and then multples the result of the Softmax operation by V, to produce attention output information. More generally stated, the attention component 1008 determines the importance of each input vector under consideration with respect to every other input vector. General background information regarding the stand-alone concept of attention is provided in VASWANI, et al., "Attention Is All You Need," in 31st Conference on Neural Information Processing Systems (NIPS 2017), 2017, 11 pages.

The add-and-normalize component 1010 includes a residual connection that combines (e.g., sums) input information fed to the attention component 1008 with the output information generated by the attention component 1008. The add-and-normalize component 1010 then performs a layer normalization operation on the output information generated by of the residual connection, e.g., by normalizing values in the output information based on the mean and standard deviation of those values. The other add-and-normalize component 1014 performs the same functions as the first-mentioned add-and-normalize component 1010. The FFN 1012 transforms input information to output information using a feed-forward neural network having any number of layers.

A classification component 1016 maps output information produced by the last encoder block 1606 to an output classification. In some implementations, the classification component 1616 is implemented as a feed-forward neural network of any type followed by a Softmax component. General background information on classification models built using transformer-based technology can be found in DEVLIN, et al., "BERT: Pre-training of Deep Bidirectional Transformers for Language Understanding," ArXiv, Cornell University, arXiv:1810.04805v2 [cs.CL], May 24, 2019, 16 pages.

Figure 11:
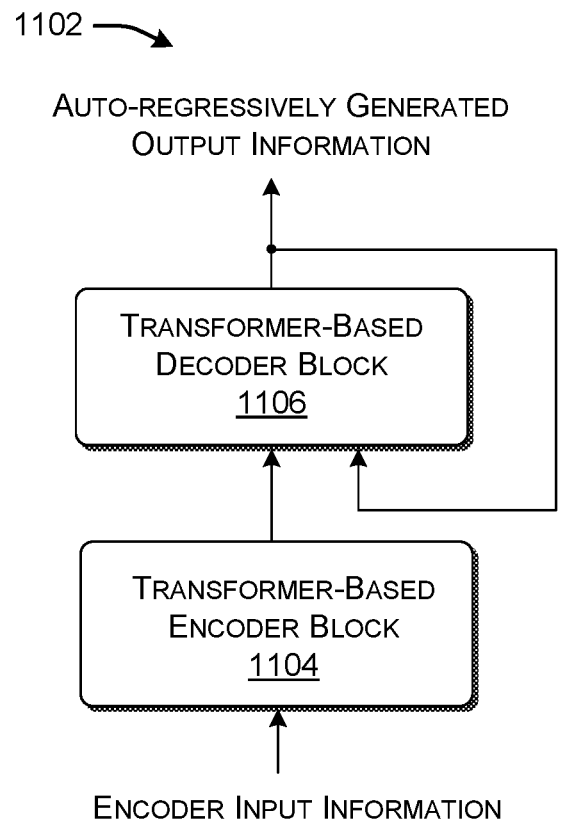
FIG. 11 shows an illustrative encoder-decoder model that the video-processing system of FIG. 1, in some implementations, uses to perform various functions, such as the generation of text.

FIG. 11 shows an encoder-decoder model 1102 that includes at least one transformer-based encoder block 1104 and at least one transformer-based decoder block 1106, both which use the kind of transformer-based functionality shown in FIG. 10. The encoder block 1104 maps encoder input information to encoder output information. The decoder block 1106 maps decoder input information to decoder output information. The decoder input information includes the encoder output information produced by the encoder block 1104 in conjunction with a last-generated classification result produced by the encoder-decoder model 1102. More specifically, in some implementations, the decoder block 1106 operates in autoregressive fashion. At each iteration, the encoder-decoder model 1102 adds its classification result to the decoder input information that is fed to the decoder block 1106. The decoder block 1106 maps this updated decoder input information into updated decoder output information. This process continues until and the encoder-decoder model 1102 predicts an end-of-sequence token.

Figure 12:
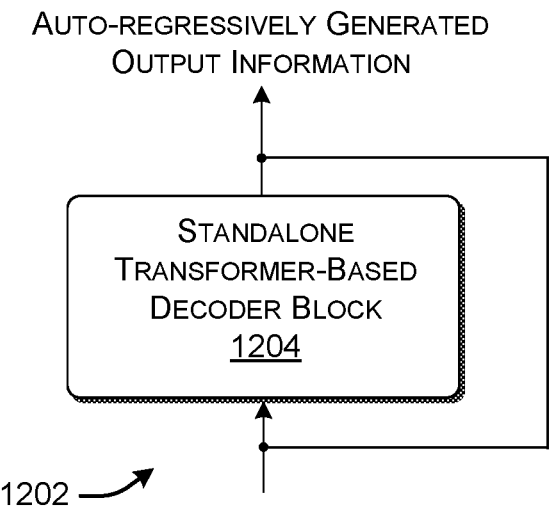
FIG. 12 shows an illustrative stand-alone decoder model that the video-processing system of FIG. 1, in some implementations, uses to perform various functions, such as the generation of text.

FIG. 12 shows a stand-alone decoder model 1202. The stand-alone decoder model 1204 includes at least one transformer-based decoder block 1204 that operates in the same manner as the decoder block 1106 of FIG. 11. However, in the case of FIG. 12, the decoder block 1204 does not receive decoder input information from a preceding encoder block. An example of an encoder-decoder model is provided in the above-cited VASWANI, et al. paper. An example of a stand-alone decoder model is the GP3 model described in BROWN, et al., "Language Models are Few-Shot Learners," arXiv, Cornell University, arXiv:2005.14165v4 [cs.CL], Jul. 22, 2020, 75 pages.

Other implementations of the video-processing system 102 use any combination of the following examples of machine-trained models: logistic regression models, random forest and decision tree models, support vector machine models, Bayesian network models, various types of deep neural networks (e.g., recurrent neural networks), etc.

B. Illustrative Processes

FIGS. 13-16 show illustrative processes that explain one manner of operation of the video-processing system 102 of Section A in flowchart form. Since the principles underlying the operation of the video-processing system 102 have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In one implementation, the blocks shown in the flowcharts that pertain to processing-related functions can be implemented by the hardware logic circuitry described in Section C, which, in turn, can be implemented by one or more processors and/or other logic units that include a task-specific collection of logic gates.

FIG. 13 shows a process 1302 for processing video information 104. In block 1304, the video-processing system 102 receives the video information 104, the video information 104 including plural video frames. In block 1306, the video-processing system 102 generates plural features that describe the video information 104 using machine-trained logic. The machine-trained logic includes an object-tracking component 118 that identifies plural objects in the video information 104 and that tracks the plural objects over the plural video frames. In some implementations, the objects correspond to people that appear in the video information 104, but the process 1302 can be applied to any predetermined class (or classes) or objects. In block 1308, the video-processing system 102 produces plural instances of object-specific feature information for the plural objects based on the plural features that have been generated (in block 1306). Each instance of object-specific feature information describes an object of the plural objects. In block 1310, the video-processing system 102 produces ranking information that determines prominence of the plural objects of in the video information 104 based on the plural instances of object-specific feature information. The prominence of each object of the plural objects is based, at least in part, on an extent to which the object appears in the video information 104. In block 1312, the video-processing system 102 uses the ranking information to control presentation of the video information 104.

FIG. 14 shows a process 1402 that explains the illustrative operation of one type of application system. In block 1404, the application system identifies a particular object of the plural objects having a rank, as established by the ranking information (computed using the process 1302 of FIG. 13), that satisfies a prescribed criterion. In block 1406, the application system identifies a particular content item (a static image, a video item, and/or a link, etc.) that matches the particular object from a data store of content items. In block 1408, the application system presents information regarding the particular content item during the presentation of the video information 104. In some implementations, block 1408 includes presenting a visual representation of the information regarding the particular content item on a user interface presentation in conjunction with presentation of the video information 104. In some implementations, the particular content item is a particular image and/or a video that relates to a characteristic of a person that appears in the video information 104.

FIG. 15 shows a process 1502 that explains the illustrative operation of another type of application system. In block 1504, the application system presents a navigation control on a user interface presentation in conjunction with presentation of the video information 104. The navigation control has navigation selection options that are determined, at least in part, based on the ranking information generated via the process 1302 of FIG. 1. In block 1506, the application system receives a signal that indicates that interaction (e.g., by a user) with the navigation control has occurred. In block 1508, the application system navigates to a location in the video information 104 based on the signal that has been received.

Figure 16:
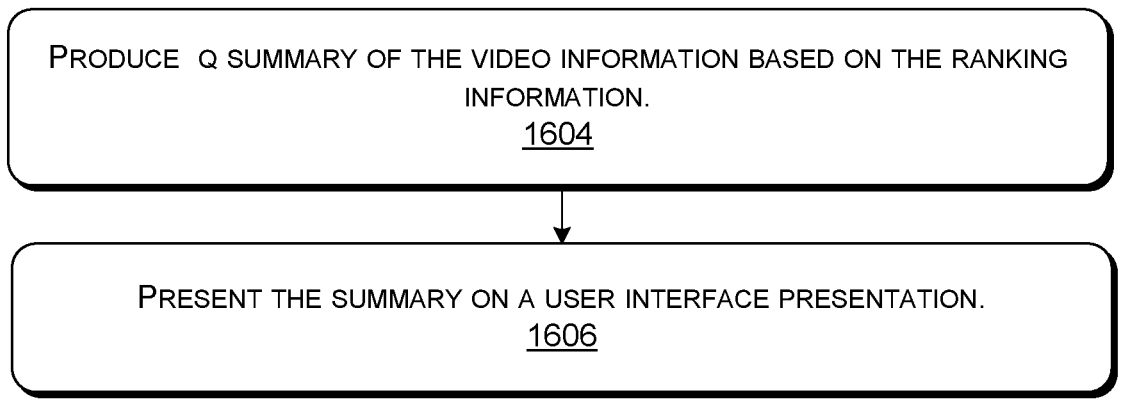

FIG. 16 shows a process 1602 that explains the illustrative operation of another application system. In block 1604, the application system produces a summary of the video information 104 based on the ranking information that is provided by the process 1302 of FIG. 13. In block 1606, the application system presents the summary on a user interface presentation.

C. Representative Computing Functionality

Figure 17:
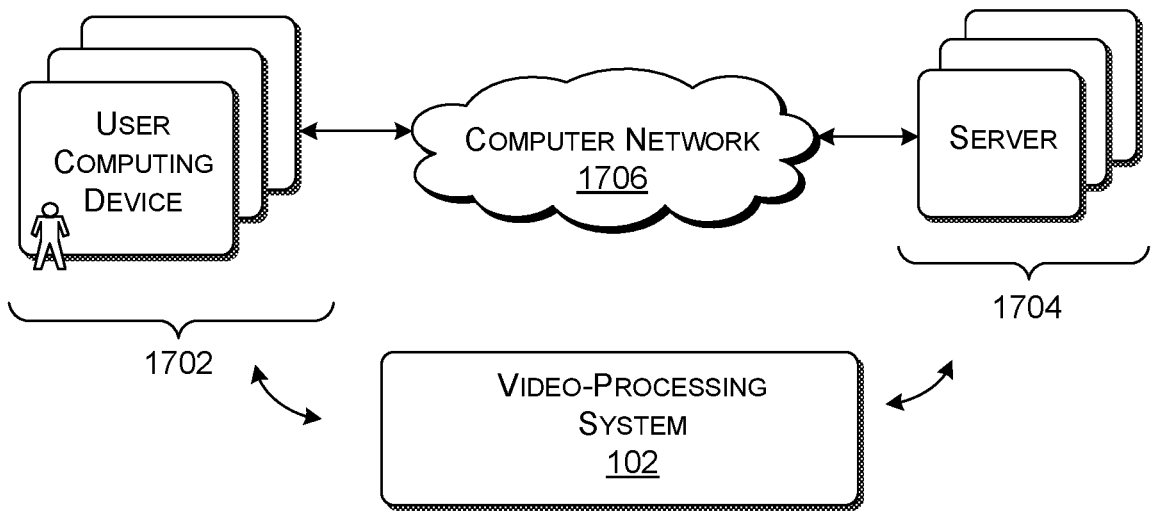
FIG. 17 shows example computing equipment that, in some implementations, is used to implement the video-processing system shown in FIG. 1.

FIG. 17 shows an example of computing equipment that, in some implementations, is used to implement any of the systems summarized above. The computing equipment includes a set of user computing devices 1702 coupled to a set of servers 1704 via a computer network 1706. In some implementations, each user computing device corresponds to any device that performs a computing function, including a desktop computing device, a laptop computing device, a handheld computing device of any type (e.g., a smartphone, or a tablet-type computing device), a mixed reality device, a wearable computing device, an Internet-of-Things (IoT) device, a gaming system, etc. In some implementations, the computer network 1706 is implemented as a local area network, a wide area network (e.g., the Internet), one or more point-to-point links, or any combination thereof.

FIG. 17 also indicates that the video-processing system 102 can be spread across the user computing devices 1702 and/or the servers 1704 in any manner. For instance, in one case, the video-processing system 102 is entirely implemented by one or more of the servers 1704. In some implementations, each user interacts with the servers 1704 via a browser application or other programmatic interfaces provided by a user computing device. In another case, the video-processing system 102 is entirely implemented by a user computing device in local fashion, in which case no interaction with the servers 1704 is necessary. In another case, the functionality associated with the video-processing system 102 is distributed between the servers 1704 and each user computing device in any manner. For example, in some implementations, each user computing device implements at least part of an application system, and the servers 1704 implement the remainder of the video-processing system 102.

Figure 18:
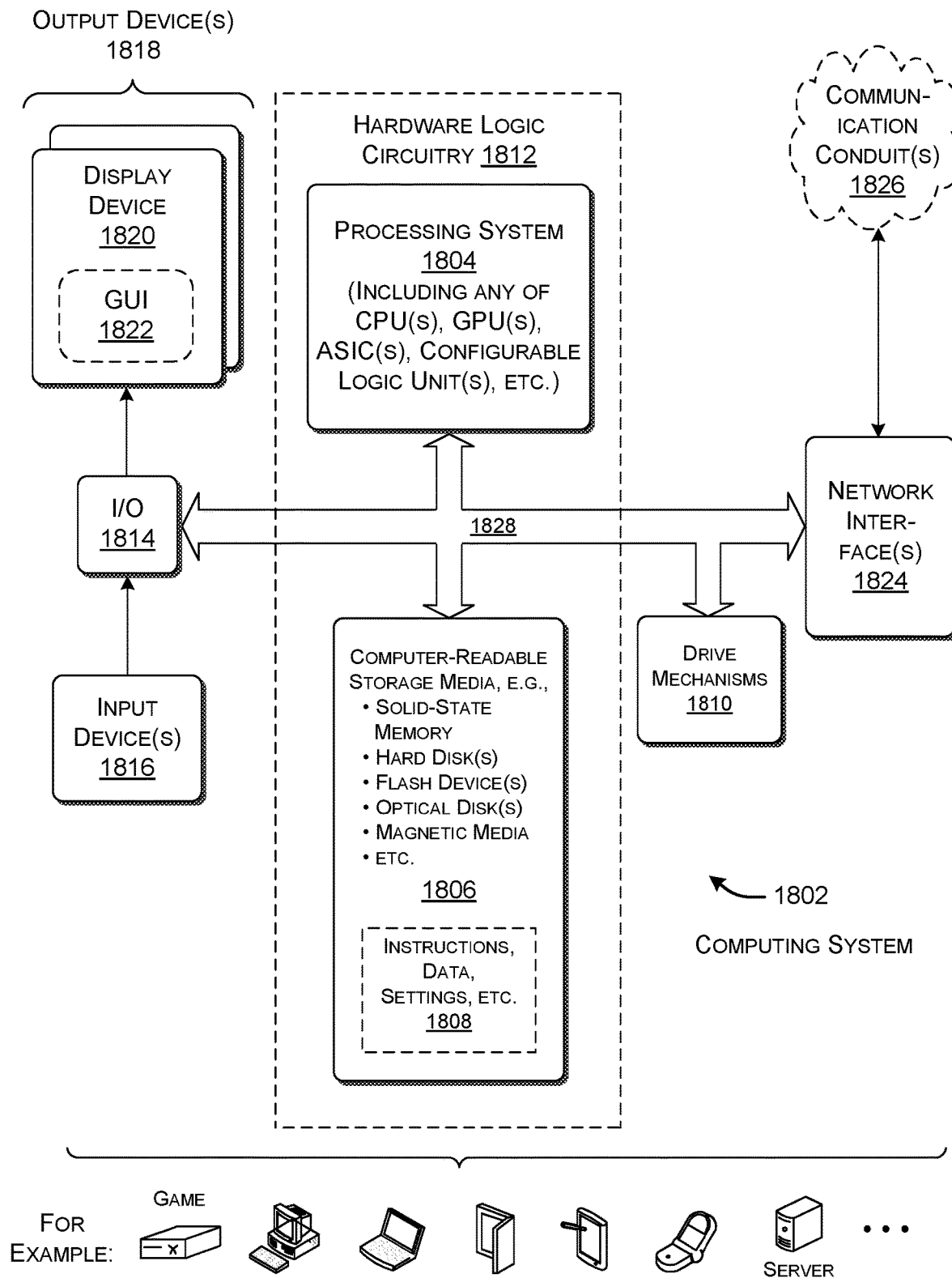
FIG. 18 shows an illustrative type of computing system that, in some implementations, is used to implement any aspect of the features shown in the foregoing drawings.

FIG. 18 shows a computing system 1802 that, in some implementations, is used to implement any aspect of the mechanisms set forth in the above-described figures. For instance, in some implementations, the type of computing system 1802 shown in FIG. 18 is used to implement any user computing device or any server shown in FIG. 17. In all cases, the computing system 1802 represents a physical and tangible processing mechanism.

The computing system 1802 includes a processing system 1804 including one or more processors. The processor(s) include, for example, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any processor corresponds to a general-purpose processing unit or an application-specific processor unit.

The computing system 1802 also includes computer-readable storage media 1806, corresponding to one or more computer-readable media hardware units. The computer-readable storage media 1806 retains any kind of information 1808, such as machine-readable instructions, settings, and/or data. For example, in some implementations, the computer-readable storage media 1806 includes one or more solid-state devices, one or more magnetic hard disks, one or more optical disks, magnetic tape, etc. Any instance of the computer-readable storage media 1806 uses any technology for storing and retrieving information. Further, any instance of the computer-readable storage media 1806 represents a fixed or removable unit of the computing system 1802. Further, any instance of the computer-readable storage media 1806 provides volatile or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media.

The computing system 1802 utilizes any instance of the computer-readable storage media 1806 in different ways. For example, in some implementations, any instance of the computer-readable storage media 1806 represents a hardware memory unit (such as Random Access Memory (RAM)) for storing transient information during execution of a program by the computing system 1802, and/or a hardware storage unit (such as a hard disk) for retaining/archiving information on a more permanent basis. In the latter case, the computing system 1802 also includes one or more drive mechanisms 1810 (such as a hard drive mechanism) for storing and retrieving information from an instance of the computer-readable storage media 1806.

In some implementations, the computing system 1802 performs any of the functions described above when the processing system 1804 executes computer-readable instructions stored in any instance of the computer-readable storage media 1806. For instance, in some implementations, the computing system 1802 carries out computer-readable instructions to perform each block of the processes described in Section B. FIG. 18 generally indicates that hardware logic circuitry 1812 includes any combination of the processing system 1804 and the computer-readable storage media 1806.

Alternatively, or in addition, the processing system 1804 includes one or more other configurable logic units that perform operations using a collection of logic gates. For instance, in some implementations, the processing system 1804 includes a fixed configuration of hardware logic gates, e.g., that are created and set at the time of manufacture, and thereafter unalterable. Alternatively, or in addition, the processing system 1804 includes a collection of programmable hardware logic gates that are set to perform different application-specific tasks. The latter category of devices includes, for example, Programmable Array Logic Devices (PALs), Generic Array Logic Devices (GALs), Complex Programmable Logic Devices (CPLDs), Field-Programmable Gate Arrays (FPGAs), etc. In these implementations, the processing system 1804 can also be said to incorporate a storage device that stores computer-readable instructions, insofar as the configurable logic units are configured to execute the instructions and therefore embody or store these instructions.

In some cases (e.g., in the case in which the computing system 1802 represents a user computing device), the computing system 1802 also includes an input/output interface 1814 for receiving various inputs (via input devices 1816), and for providing various outputs (via output devices 1818). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1820 and an associated graphical user interface presentation (GUI) 1822. The display device 1820 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1802 also includes one or more network interfaces 1824 for exchanging data with other devices via one or more communication conduits 1826. One or more communication buses 1828 communicatively couple the above-described units together.

The communication conduit(s) 1826 can be implemented in any manner, e.g., by a local area computer network, a wide area computer network (e.g., the Internet), point-to-point connections, or any combination thereof. The communication conduit(s) 1826 can include any combination of hardwired links, wireless links, routers, gateway functionality, name servers, etc., governed by any protocol or combination of protocols.

FIG. 18 shows the computing system 1802 as being composed of a discrete collection of separate units. In some cases, the collection of units corresponds to discrete hardware units provided in a computing device chassis having any form factor. FIG. 18 shows illustrative form factors in its bottom portion. In other cases, the computing system 1802 includes a hardware logic unit that integrates the functions of two or more of the units shown in FIG. 1. For instance, in some implementations, the computing system 1802 includes a system on a chip (SoC or SOC), corresponding to an integrated circuit that combines the functions of two or more of the units shown in FIG. 18.

The following summary provides a set of illustrative examples of the technology set forth herein.

(A1) According to a first aspect, some implementations of the technology described herein include a computer-implemented method (e.g., the process 1302) for processing video information (e.g., the video information 104). The method includes receiving (e.g., in block 1304) the video information, the video information including plural video frames, and generating (e.g., in block 1306) plural features that describe the video information using machine-trained logic (e.g., the models in the video analysis component 112). The machine-trained logic includes an object-tracking model (e.g., the object-tracking component 118) that identifies plural objects in the video information and that tracks the plural objects over the plural video frames. The method further includes producing (e.g., in block 1308) plural instances of object-specific information based on the plural features that have been generated. Each instance of object-specific feature information describes an object of the plural objects. The method further includes producing (e.g., in block 1310) ranking information that determines prominence of each object of the plural objects in the video information based on the plural instances of object-specific feature information. A prominence of each object of the plural objects is based, at least in part, on an extent to which the object appears in the video information.

(A2) According to some implementations of the method of A1, the operation of generating plural features includes generating a first set of features based on audio content of the video information, and generating a second set of features based on visual content of the video information.

(A3) According to some implementations of any of the methods of A1 or A2, the plural objects are people. In those examples, each instance of object-specific feature information is an instance of person-specific feature information.

(A4) According to some implementations of any of the methods of A1-A3, an instance of object-specific feature information associated with a particular object of the plural objects describes a frequency at which the particular object appears in the plural video frames.

(A5) According to some implementations of any of the methods of A1-A4, an instance of object-specific feature information associated with a particular object of the plural objects describes whether the particular object is a particular person who is a member of a set of people who have been previously identified as having a particular status.

(A6) According to some implementations of any of the methods of A1-A5, an instance of object-specific feature information associated with a particular object of the plural objects describes whether the particular object has appeared in the video information simultaneously with information pertaining to a particular product or class of products.

(A7) According to some implementations of any of the methods of A1-A6, an instance of object-specific feature information associated with a particular object of the plural objects describes a size of an appearance of the particular object in a particular video frame, with respect to an entire size of the particular video frame.

(A8) According to some implementations of the method of A7, the instance of object-specific feature information provides a summary of the size of the appearance of the particular object of the plural objects in each of the plural video frames in which the particular object appears.

(A9) According to some implementations of any of the methods of A1-A8, an instance of object-specific feature information associated with a particular object of the plural objects describes whether a prescribed emotion has been detected in the video information in conjunction with appearance of the particular object in the video information.

(A10) According to some implementations of any of the methods of A1-A9, an instance of object-specific feature information associated with a particular object of the plural objects describes whether a prescribed audio effect occurs in the video information in conjunction with appearance of the particular object.

(A11) According to some implementations of any of the methods of A1-A10, an instance of object-specific feature information associated with a particular object of the plural objects describes whether a prescribed behavior by a group of people is exhibited in the video information in conjunction with appearance of the particular object.

(A12) According some implementations of any of the methods of A1-A11, the method further includes using the ranking information to control presentation of the video information.

(A13) According to some implementations of the method of A12, the control of the presentation of the video information includes: identifying a particular object of the plural objects in the class of objects having a rank, as established by the ranking information, that satisfies a prescribed criterion; identifying a particular content item that matches the particular object from a data store of content items; and presenting information regarding the particular content item during the presentation of the video information.

(A14) According to some implementations of the method of A13, the operation of presenting occurs in response to detecting a juncture in the presentation of the video information at which the particular object appears in the video information.

(A15) According to some implementations of the method of A13, the operation of presenting includes presenting a visual representation of the information regarding the particular content item on a user interface presentation in conjunction with presentation of the video information.

(A16) According some implementations of the method of A12, the control of presentation of the video information includes: presenting a navigation control on a user interface presentation in conjunction with presentation of the video information, the navigation control having navigation selection options that are determined, at least in part, based on the ranking information; receiving a signal that indicates interaction (e.g., by a user) with the navigation control has occurred; and navigating to a location in the video information based on the signal that has been received.

(A17) According to some implementations of the method of A12, the control of the presentation of the video information includes presenting a summary of the video information on a user interface presentation, the summary being produced based on the ranking information.

In yet another aspect, some implementations of the technology described herein include a computing system (e.g., the video-processing system 102, the computing system 1802) for processing video information (e.g., the video information 104). The computing system includes a processing system (e.g., the processing system 804) having a processor. The computing system also includes a storage device (e.g., the computer-readable storage medium 1806) for storing computer-readable instructions (e.g., information 1808) that, when executed by the processing system, perform any of the methods described herein (e.g., any of the methods of A1-A17).

In yet another aspect, some implementations of the technology described herein include a computer-readable storage medium (e.g., the computer-readable storage medium 1806) for storing computer-readable instructions (e.g., the information 1808). The processing system (e.g., the processing system 1804) executes the computer-readable instructions to perform any of the operations described herein (e.g., the operation in any of the methods of A1-A17).

More generally stated, any of the individual elements and steps described herein can be combined, for example, into any logically consistent permutation or subset. Further, any such combination can be manifested, for example, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuitry 1812 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any mention of a single entity is not intended to preclude the use of plural such entities; similarly, a description of plural entities in the specification is not intended to preclude the use of a single entity. Further, while the description may explain certain features as alternative ways of carrying out identified functions or implementing identified mechanisms, the features can also be combined together in any combination. Further, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of," is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. A "set" can include zero members, one member, or more than one member. Finally, the terms "exemplary" or "illustrative" refer to one implementation among potentially many implementations.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems.

This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for processing video information, comprising:
    receiving the video information, the video information including plural video frames;
    generating plural raw features that describe different aspects of the video information using machine-trained logic that has plural machine-trained models, the plural machine-trained models including an object-tracking model that identifies plural objects in the video information and that tracks the plural objects over the plural video frames,
    the generating including accumulating plural sets of raw features produced by the plural machine-trained models, including the object tracking model, on a per-object basis over the video frames of the video information;
    producing plural instances of object-specific information that respectively describe the plural objects based on the respective sets of raw features that have been generated, a particular instance of the object-specific information, of the plural instances, being associated with a particular object, of the plural objects and a particular set of raw features,
    the particular instance of the object-specific information including plural types of feature information that describe the particular object; and
    producing ranking information that determines prominence of the plural objects in the video information based on the plural instances of object-specific information, the ranking information for the particular object being based on the plural types of feature information in the particular instance of object-specific information,
    a prominence of the particular object of the plural objects being based, at least in part, on an extent to which the particular object appears in the video information.

2. The computer-implemented method of claim 1, further comprising extracting audio information and visual information from the video information,
    wherein said generating plural raw features includes using the plural machine-trained models to generate a first set of raw features based on the audio information, and to generate a second set of raw features based on the visual information.

3. The computer-implemented method of claim 1, wherein the plural objects are people.

4. The computer-implemented method of claim 1, wherein a type of feature information associated with the particular object of the plural objects describes a frequency at which the particular object appears in the plural video frames, based on a number of frames in which the particular object appears in the plural video frames, and a total number of the plural video frames.

5. The computer-implemented method of claim 1, wherein a type of feature information associated with the particular object of the plural objects describes whether the particular object is a particular person who is a member of a set of people who have been previously identified as having a particular public status.

6. The computer-implemented method of claim 1, wherein a type of feature information of the plural objects describes an extent to which the particular object has appeared in the video information simultaneously with information pertaining to a particular product or class of products.

7. The computer-implemented method of claim 1, wherein a type of feature information associated with the particular object of the plural objects is determined by:
    determining measures for all respective video frames of the plural video frames in which the particular object appears, each measure for a particular video frame computed as a size of a bounding box in which the particular object appears, divided by a size of the particular video frame as a whole; and
    generating an average of the measures.

8. The computer-implemented method of claim 1, wherein a type of feature information associated with the particular object of the plural objects describes whether a prescribed non-verbal audio effect occurs in the video information in conjunction with appearance of the particular object.

9. The computer-implemented method of claim 8, wherein non-verbal sounds include any of clapping, cheering, laughter, and/or gasps.

10. The computer-implemented method of claim 1, further including using the ranking information to configure navigation selection options in a navigation control that is presented on a user interface presentation.

11. The computer-implemented method of claim 1, wherein the particular object is a particular person, wherein the plural machine-trained models include a face detection model that recognizes an identity of the particular person by recognizing a face of the particular person.

12. The computer-implemented method of claim 11, wherein the particular face of the particular person is recognized by:
    identifying a unique face in the plural video frames using object detection;
    generating feature information associated with the unique face;
    mapping the feature information to a distributed source face vector; and
    determining whether the source face vector is a match for any target face vector associated with a public person, as previously computed and stored in a target vector data store.

13. The computer-implemented method of claim 1, wherein a type of feature information that is used to determine the prominence of the particular object of the plural objects is determined based on any of: a number of the plural video frames in which the particular object has appeared together with brand-related information; and/or a size of the brand-related information in each of the plural video frames in which the particular object has appeared; and/or a proximity of the particular object to the brand-related information in each of the plural video frames in which the particular object has appeared.

14. The computer-implemented method of claim 1, wherein a type of feature information that is used to determine the prominence of the particular object of the plural objects is determined based on a number of the plural video frames in which the particular object has appeared together with logo information.

15. The computer-implemented method of claim 1, further comprising identifying a particular content item in a data store of content items that matches a product or logo that appears in the video information that the particular object is using, or wearing, or standing in proximity to.

16. A computing system for processing video information, comprising:
 a processing system comprising a processor; and
 a storage device for storing machine-readable instructions that, when executed by the processing system, perform operations comprising:
 receiving the video information, the video information including plural video frames;
 extracting audio information and visual information from the video information;
 generating plural raw features that describe different aspects of the video information using machine-trained logic that has plural machine-trained models, the plural-machine-trained models including an object-tracking model that identifies plural objects in the visual information and that tracks the plural objects over the plural video frames, and an audio effect detection model that determines whether the audio information associated with the video information includes predetermined audio effects that indicate that something of interest is happening in the video information, some of the raw features originating from analysis by the object-tracking model of the visual information, and some of the raw features originating from analysis by the audio effect detection model of the audio information,
 the generating including accumulating plural sets of raw features produced by the plural machine-trained models, including the object tracking model and the audio effect detection model, on a per-object basis over the video frames of the video information;
 producing plural instances of object-specific information that respectively describe the plural objects based on the respective sets of raw features that have been generated, a particular instance of the object-specific information, of the plural instances, being associated with a particular object, of the plural objects and a particular set of raw features,
 the particular instance of the object-specific information including plural types of feature information that describe the particular object; and
 producing ranking information that determines prominence of the plural objects in the video information based on the plural instances of object-specific information, the ranking information for the particular object being based on the plural types of feature information in the particular instance of object-specific information,
 a prominence of the particular object of the plural objects being based, at least in part, on an extent to which the particular object appears in the video information.

17. The computing system of claim 16, wherein the plural objects are people.

18. The computing system of claim 16, further including using the ranking information to control presentation of the video information by:
 presenting a navigation control on a user interface presentation in conjunction with presentation of the video information, the navigation control having navigation selection options that are determined, at least in part, based on the ranking information;
 receiving a signal that indicates that interaction with the navigation control has occurred; and
 navigating to a location in the video information based on the signal that has been received.

19. The computing system of claim 16, further including presenting a summary of the video information on a user interface presentation, the summary being produced based on the ranking information,
 the summary being a video digest that includes selected video frames of the plural video frames in which the objects that have been assessed as prominent appear.

20. A computer-readable storage medium for storing computer-readable instructions, wherein a processor executing the computer-readable instructions performs operations comprising:
 receiving video information, the video information including plural video frames;
 generating plural raw features that describe different aspects of the video information using machine-trained logic that has plural machine-trained models, the plural machine-trained models including an object-tracking model that identifies people in the video information and that tracks the people over the plural video frames,
 the generating including accumulating plural sets of raw features produced by the plural machine-trained models, including the object tracking model, on a per-person basis over the video frames of the video information;
 producing plural instances of person-specific feature information that respectively describe the people based on the respective sets of raw features that have been generated, a particular instance of the person-specific information, of the plural instances, being associated with a particular person, of the plural people and a particular set of raw features,
 the particular instance of the person-specific information including plural types of feature information that describe the particular person; and
 producing ranking information that determines prominence of the people in the video information based on the plural instances of person-specific feature information, the ranking information for the particular person being based on the plural types of feature information in the particular instance of person-specific feature information,
 a prominence of the particular person being based, at least in part, on an extent to which the particular person appears in the video information.

\* \* \* \* \*